United States Patent
Chu et al.

(10) Patent No.: US 10,694,546 B2
(45) Date of Patent: Jun. 23, 2020

(54) MEDIA ACCESS CONTROL FOR DUPLEX TRANSMISSIONS IN WIRELESS LOCAL AREA NETWORKS

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/132,154

(22) Filed: Sep. 14, 2018

(65) Prior Publication Data

US 2019/0098664 A1 Mar. 28, 2019

Related U.S. Application Data

(60) Provisional application No. 62/566,970, filed on Oct. 2, 2017, provisional application No. 62/561,988, filed on Sep. 22, 2017.

(51) Int. Cl.
*H04W 74/08* (2009.01)
*H04L 5/14* (2006.01)
(Continued)

(52) U.S. Cl.
CPC ....... *H04W 74/0816* (2013.01); *H04L 1/1607* (2013.01); *H04L 1/1854* (2013.01);
(Continued)

(58) Field of Classification Search
CPC ......... H04W 74/0808; H04W 74/0816; H04W 74/0825; H04W 28/06; H04L 1/1607;
(Continued)

(56) References Cited

U.S. PATENT DOCUMENTS 9,450,743 B1 * 9/2016 Chu .................. H04L 69/22
2002/0041599 A1 * 4/2002 Chang .............. G06F 1/3203
370/413
(Continued)

OTHER PUBLICATIONS

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

(Continued)

*Primary Examiner* — Kevin D Mew

(57) ABSTRACT

A first communication device receives an indication that a second communication device permits a duplex transmission while the second communication device transmits during a transmit opportunity period (TXOP), where duplex transmissions involve simultaneously transmitting and receiving via a same wireless frequency band. The indication is included in a media access control layer (MAC) protocol data unit (MPDU). In response to receiving the indication that the second communication device permits the duplex transmission, the first communication device determines that the first communication device is permitted to perform the duplex transmission during the TXOP. The first communication device receives a first packet from the second communication device during the TXOP, and transmits a second packet while the first communication device is receiving the first packet.

22 Claims, 14 Drawing Sheets

(51) Int. Cl.
*H04L 1/16* (2006.01)
*H04L 29/06* (2006.01)
*H04W 28/06* (2009.01)
*H04L 1/18* (2006.01)

(52) U.S. Cl.
CPC ............... *H04L 5/14* (2013.01); *H04L 69/22* (2013.01); *H04W 28/06* (2013.01)

(58) Field of Classification Search
CPC ... H04L 1/1621; H04L 1/1854; H04L 1/1858; H04L 5/14; H04L 69/22
See application file for complete search history.

(56) References Cited

U.S. PATENT DOCUMENTS

| | | | |
|---|---|---|---|
| 2005/0135284 A1* | 6/2005 | Nanda | H04W 74/06 370/294 |
| 2005/0135295 A1* | 6/2005 | Walton | H04W 74/00 370/328 |
| 2010/0074119 A1* | 3/2010 | Krishnaswamy | H04L 47/10 370/242 |
| 2014/0078940 A1* | 3/2014 | Aggarwal | H04L 12/40013 370/278 |
| 2014/0146716 A1* | 5/2014 | Chen | H04L 5/16 370/277 |
| 2015/0016309 A1* | 1/2015 | Fang | H04L 5/14 370/277 |
| 2015/0063111 A1* | 3/2015 | Merlin | H04L 1/0031 370/235 |
| 2015/0172038 A1* | 6/2015 | Jiang | H04L 5/143 370/280 |
| 2015/0195079 A1* | 7/2015 | Gong | H04L 5/1415 370/277 |
| 2015/0319609 A1* | 11/2015 | Asterjadhi | H04W 74/006 370/328 |
| 2016/0037364 A1* | 2/2016 | Kairouz | H04W 24/08 370/252 |
| 2016/0135189 A1* | 5/2016 | Chandrasekhar | H04W 72/0453 370/329 |
| 2016/0226631 A1* | 8/2016 | Seo | H04L 1/1854 |
| 2016/0234831 A1* | 8/2016 | Tian | H04W 72/0413 |
| 2016/0344535 A1* | 11/2016 | Kakani | H04L 5/1438 |
| 2017/0026162 A1* | 1/2017 | Nabetani | H04W 74/0816 |
| 2017/0180103 A1* | 6/2017 | Min | H04L 5/14 |
| 2018/0020476 A1 | 1/2018 | Aijaz et al. | |
| 2018/0192425 A1* | 7/2018 | Yeh | H04W 72/0413 |
| 2018/0192431 A1* | 7/2018 | Wang | H04W 72/1252 |
| 2018/0254930 A1* | 9/2018 | Luo | H04B 1/123 |
| 2018/0262449 A1* | 9/2018 | Erceg | H04L 1/0001 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11ac™—2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

\* cited by examiner

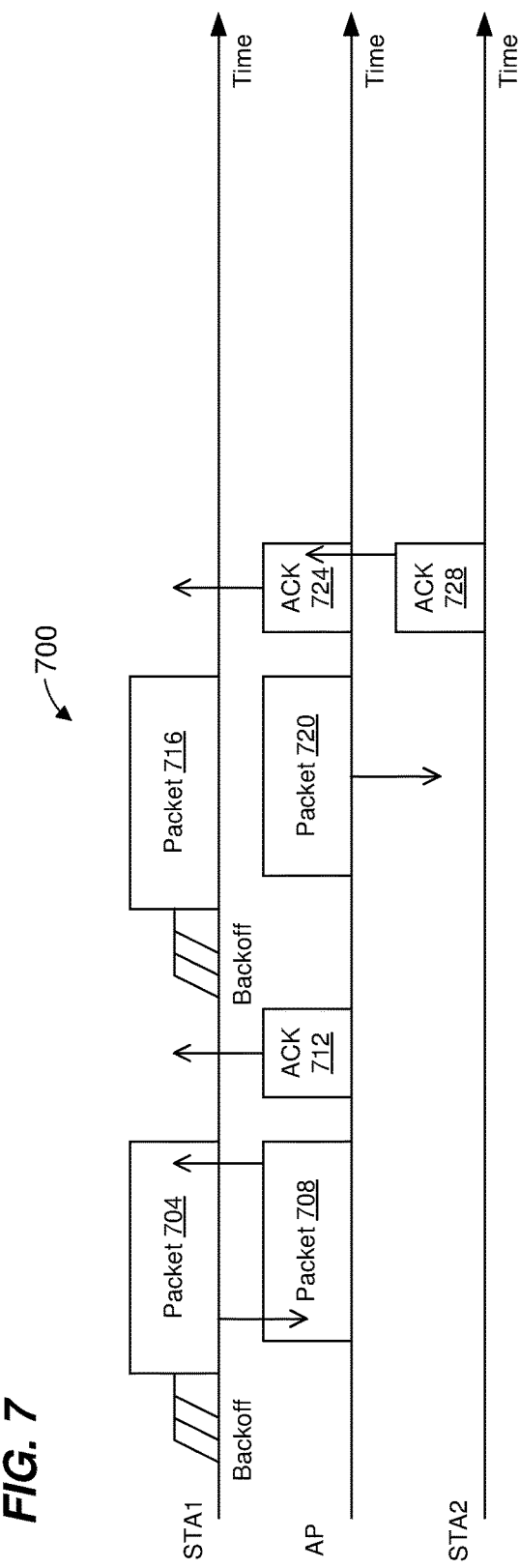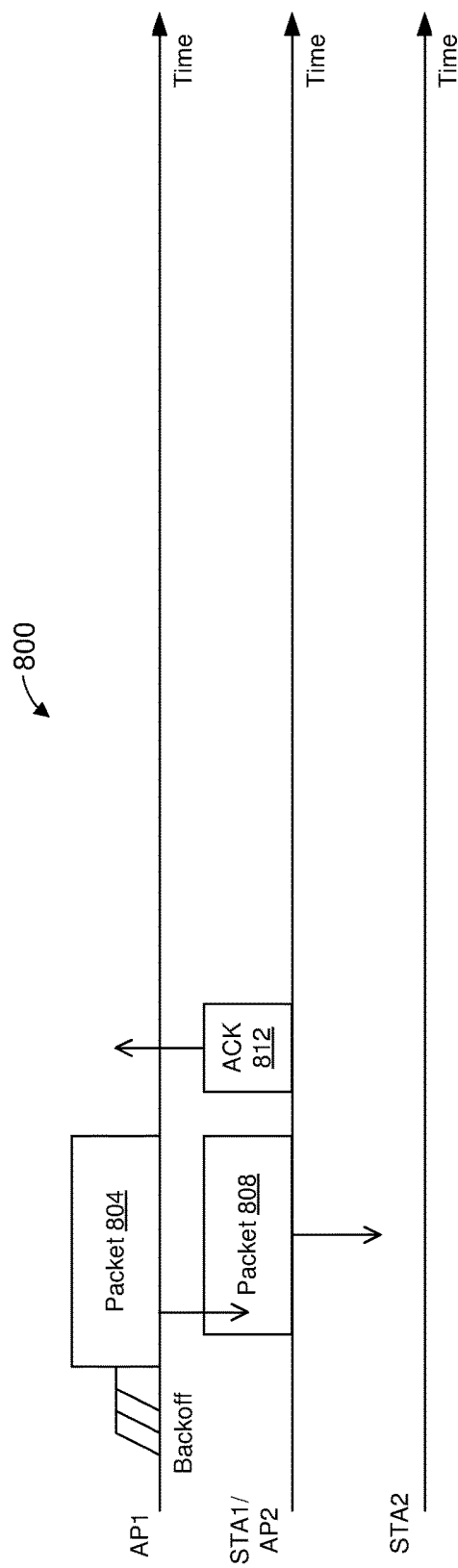

MEDIA ACCESS CONTROL FOR DUPLEX TRANSMISSIONS IN WIRELESS LOCAL AREA NETWORKS

CROSS REFERENCES TO RELATED APPLICATIONS

This application claims the benefit of U.S. Provisional Patent Application No. 62/561,988, entitled "Duplex MAC Consideration," filed on Sep. 22, 2017, and U.S. Provisional Patent Application No. 62/566,970, entitled "Duplex Transmission Service Period," filed on Oct. 2, 2017. Both of the applications referenced above are incorporated herein by reference in their entireties.

FIELD OF TECHNOLOGY

The present disclosure relates generally to wireless communication systems, and more particularly to full-duplex transmissions in a wireless local area network (WLAN).

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Traditional WLAN devices are not configured to transmit and receive simultaneously within the same communication channel because the transmission will cause "self-interference" with the reception. However, self-interference cancellation techniques now allow permit simultaneous wireless transmission and reception within the same communication channel.

SUMMARY

In an embodiment, a method is implemented by a first communication device that is capable of duplex transmissions. Duplex transmissions involve simultaneously transmitting and receiving via a same wireless frequency band. The method includes: receiving, at the first communication device, an indication that a second communication device permits a duplex transmission while the second communication device transmits during a transmit opportunity period (TXOP) established by the second communication device, wherein the indication is received from the second communication device via a wireless transmission, and wherein the indication is included in a media access control layer (MAC) protocol data unit (MPDU); in response to receiving the indication that the second communication device permits the duplex transmission, determining, at the first communication device, that the first communication device is permitted to perform the duplex transmission during the TXOP; receiving, at the first communication device, a first packet from the second communication device during the TXOP, wherein the first packet spans a wireless communication channel; and transmitting, by the first communication device, a second packet while the first communication device is receiving the first packet, and wherein the second packet is transmitted in the wireless communication channel.

In another embodiment, an apparatus comprises a network interface device associated with a first communication device. The network interface device is capable of duplex transmissions that involve simultaneously transmitting and receiving via a same wireless frequency band. The network interface device includes one or more integrated circuit (IC) devices configured to: receive an indication that a second communication device permits a duplex transmission while the second communication device transmits during a transmit opportunity period (TXOP) established by the second communication device, wherein the indication is received from the second communication device via a wireless transmission, and wherein the indication is included in a media access control layer (MAC) protocol data unit (MPDU); in response to receiving the indication that the second communication device permits the duplex transmission, determine that the network interface device is permitted to perform the duplex transmission during the TXOP; receive a first packet from the second communication device during the TXOP, wherein the first packet spans a wireless communication channel; and transmit a second packet while the first communication device is receiving the first packet, and wherein the second packet is transmitted in the wireless communication channel.

In yet another embodiment, a method is implemented by a first communication device that is capable of duplex transmissions that involve simultaneously transmitting and receiving via a same wireless frequency band. The method includes: transmitting, by the first communication device, an indication that the first communication device permits a duplex transmission while the first communication device transmits during a transmit opportunity period (TXOP) established by the first communication device, wherein the indication is transmitted to a second communication device via a wireless transmission, and wherein the indication is included in a media access control layer (MAC) protocol data unit (MPDU); transmitting, by the first communication device, a first packet to the second communication device during the TXOP, wherein the first packet spans a wireless communication channel; and receiving, at the first communication device, an acknowledgment packet from the second communication device, wherein the acknowledgment packet acknowledges receipt of the first packet.

In still another embodiment, apparatus comprises a network interface device associated with a first communication device. The network interface device is capable of duplex transmissions that involve simultaneously transmitting and receiving via a same wireless frequency band. The network interface device includes one or more integrated circuit (IC) devices configured to: transmit an indication that the first communication device permits a duplex transmission while the first communication device transmits during a transmit opportunity period (TXOP) established by the first communication device, wherein the indication is transmitted to a second communication device via a wireless transmission, and wherein the indication is included in a media access control layer (MAC) protocol data unit (MPDU); transmit a first packet to the second communication device during the TXOP, wherein the first packet spans a wireless communication channel; and receive an acknowledgment packet from the second communication device, wherein the acknowledgment packet acknowledges receipt of the first packet.

BRIEF DESCRIPTION OF THE DRAWINGS

FIG. 7 is a timing diagram of another example duplex communication exchange, according to another embodiment.

FIG. 8 is a timing diagram of another example duplex communication exchange, according to another embodiment.

DETAILED DESCRIPTION

Duplex transmission techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, duplex transmission techniques such as described herein are utilized in other types of wireless communication systems such as personal area networks (PANs), mobile communication networks such as cellular networks, metropolitan area networks (MANs), satellite communication networks, etc.

Figure 1:
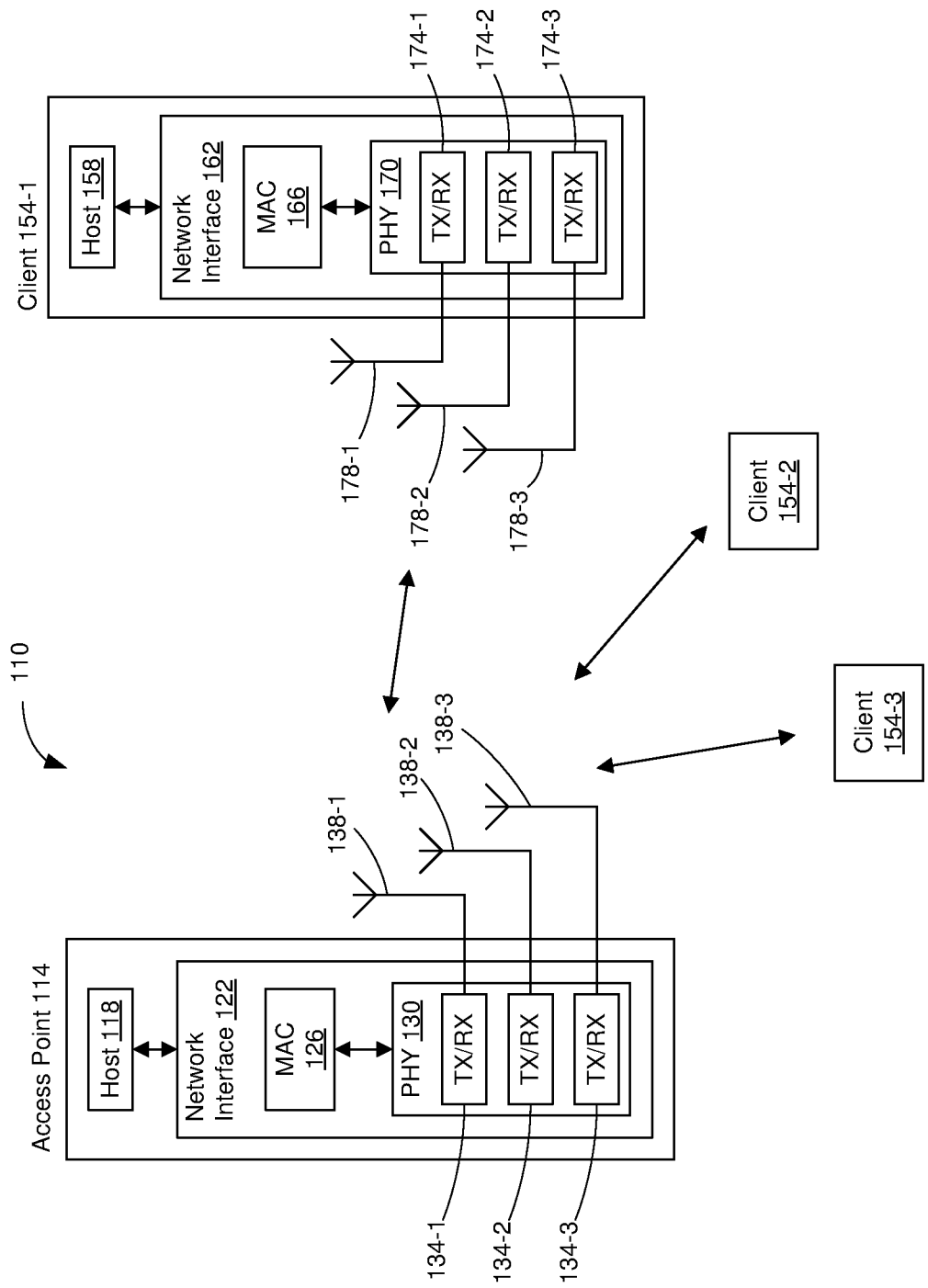
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a ROM, a flash memory, etc. In an embodiment, the MAC processor 126 includes a hardware state machine.

In an embodiment, the network interface 122 is configured for in-band duplex communications. For example, in an embodiment, the access point 114 includes different antennas 138 (e.g., one or more transmit antennas 138, and one or more receive antennas 138) for transmission and reception, and the network interface 122 includes separate ports for electrically coupling to the one or more transmit antennas 138, and one or more receive antennas 138. In some embodiments, pathloss between transmit antennas 138 and receive antennas 138 can be increased by spacing the transmit/receive antennas apart and/or by utilizing absorptive shielding between transmit antennas 138 and receive antennas 138. In some embodiments, polarized antennas 138 are utilized, where the transmit antennas 138 and the receive antennas 138 are differently polarized. For example, transmit antennas 138 are configured to transmit only horizontally polarized signals, whereas receive antennas 138 are configured to receive only vertically polarized signals. In some embodiments, directional antennas 138 are utilized. For example, the directional antennas 138 are positioned such that receive antennas 138 are in null directions of the transmit antennas, and vice versa. In another embodiment, omnidirectional antennas 138 are placed to reduce self-interference. For example, omnidirectional antennas 138 are placed such that an omnidirectional receive antenna 138 is at a location at which carrier waveforms from two omnidirectional transmit antennas 138 are 180 degrees out of phase. In some embodiments, multiple input, multiple output (MIMO) beamforming techniques are utilized to reduce self-interference. For example, transmit and receive signals are beamformed in different directions to reduce self-interference.

In some embodiments, dual transmit/receive antennas 138 are utilized, and analog RF circuitry in the PHY processor 130 includes a duplexes, such as a circulator, configured to route transmit signals from a transmitter to the antenna and to route signals received on the antenna to a receiver, all while isolating a receiver-chain from a transmit-chain.

In some embodiments, the PHY processor 130 includes analog circuitry configured to cancel, from receive signals, transmit signals. For example, an analog circuit is configured to tap an RF transmit signal being provided to an antenna port, electronically process the tapped signal, and subtract from an RF receive signal in order to reduce self-interference. In some embodiments, the analog circuitry is also configured to cancel, from receive signals, reflections (multipath signals) of a transmit signal.

In some embodiments, the PHY processor 130 is configured to utilize digital signal processing (DSP) to cancel, from receive signals, transmit signals. For example, the PHY processor 130 includes a DSP processor (configured to execute machine readable instructions stored in a memory (not shown)) and/or DSP circuitry to cancel transmit signals from receive signals at baseband.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, the network interface 162 is configured for in-band duplex communications. For example, in an embodiment, the client station 154-1 includes different antennas 178 (e.g., one or more transmit antennas 178, and one or more receive antennas 178) for transmission and reception, and the network interface 162 includes separate ports for electrically coupling to the one or more transmit antennas 178, and one or more receive antennas 178. In some embodiments, pathloss between transmit antennas 178 and receive antennas 178 can be increased by spacing the transmit/receive antennas apart and/or by utilizing absorptive shielding between transmit antennas 178 and receive antennas 178. In some embodiments, polarized antennas 178 are utilized, where the transmit antennas 178 and the receive antennas 178 are differently polarized. For example, transmit antennas 178 are configured to transmit only horizontally polarized signals, whereas receive antennas 178 are configured to receive only vertically polarized signals. In some embodiments, directional antennas 178 are utilized. For example, the directional antennas 178 are positioned such that receive antennas 178 are in null directions of the transmit antennas, and vice versa. In another embodiment, omnidirectional antennas 178 are placed to reduce self-interference. For example, omnidirectional antennas 178 are placed such that an omnidirectional receive antenna 178 is at a location at which carrier waveforms from two omni-directional transmit antennas 178 are 180 degrees out of phase. In some embodiments, MIMO beamforming techniques are utilized to reduce self-interference. For example, transmit and receive signals are beamformed in different directions to reduce self-interference.

In some embodiments, dual transmit/receive antennas 178 are utilized, and analog RF circuitry in the PHY processor 170 includes a duplexer, such as a circulator, configured to route transmit signals from a transmitter to the antenna and to route signals received on the antenna to a receiver, all while isolating a receiver-chain from a transmit-chain.

In some embodiments, the PHY processor 170 includes analog circuitry configured to cancel, from receive signals, transmit signals. For example, an analog circuit is configured to tap an RF transmit signal being provided to an antenna port, electronically process the tapped signal, and subtract from an RF receive signal in order to reduce self-interference. In some embodiments, the analog circuitry is also configured to cancel, from receive signals, reflections (multipath signals) of a transmit signal.

In some embodiments, the PHY processor 170 is configured to utilize DSP to cancel, from receive signals, transmit signals. For example, the PHY processor 170 includes a DSP processor (configured to execute machine readable instructions stored in a memory (not shown)) and/or DSP circuitry to cancel transmit signals from receive signals at baseband.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In some embodiments, one or both of the client stations 154-2 and 154-3 is configured for in-band duplex communication. In some embodiments, one or both of the client stations 154-2 and 154-3 is not configured for in-band duplex communication.

Figure 2A:
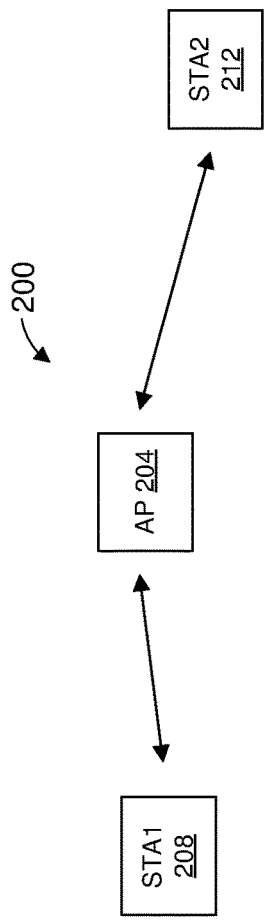
FIG. 2A is a diagram of a spatial arrangement of an example WLAN, according to an embodiment.

FIG. 2A is a diagram of a spatial arrangement of an example WLAN 200, according to an embodiment. The WLAN 200 includes an AP 204, a client station 208 (STA1), and a client station 212 (STA2). The AP 204 is positioned between the client station 208 and the client station 212 such that a distance between the client station 208 and the client station 212 is relatively far as compared to i) a distance between the AP 204 and the client station 208, and ii) a distance between the AP 204 and the client station 212.

In an embodiment, the AP 204 has the structure of the AP 114 of FIG. 1. In another embodiment, the AP 204 has another suitable structure. In an embodiment, the client station 208 has the structure of the client station 154-1 of FIG. 1. In another embodiment, the client station 208 has another suitable structure. In an embodiment, the client station 212 has the structure of the client station 154-1 of FIG. 1. In another embodiment, the client station 212 has another suitable structure. In an embodiment, the client station 212 is not configured for in-band duplex communication.

Figure 2B:
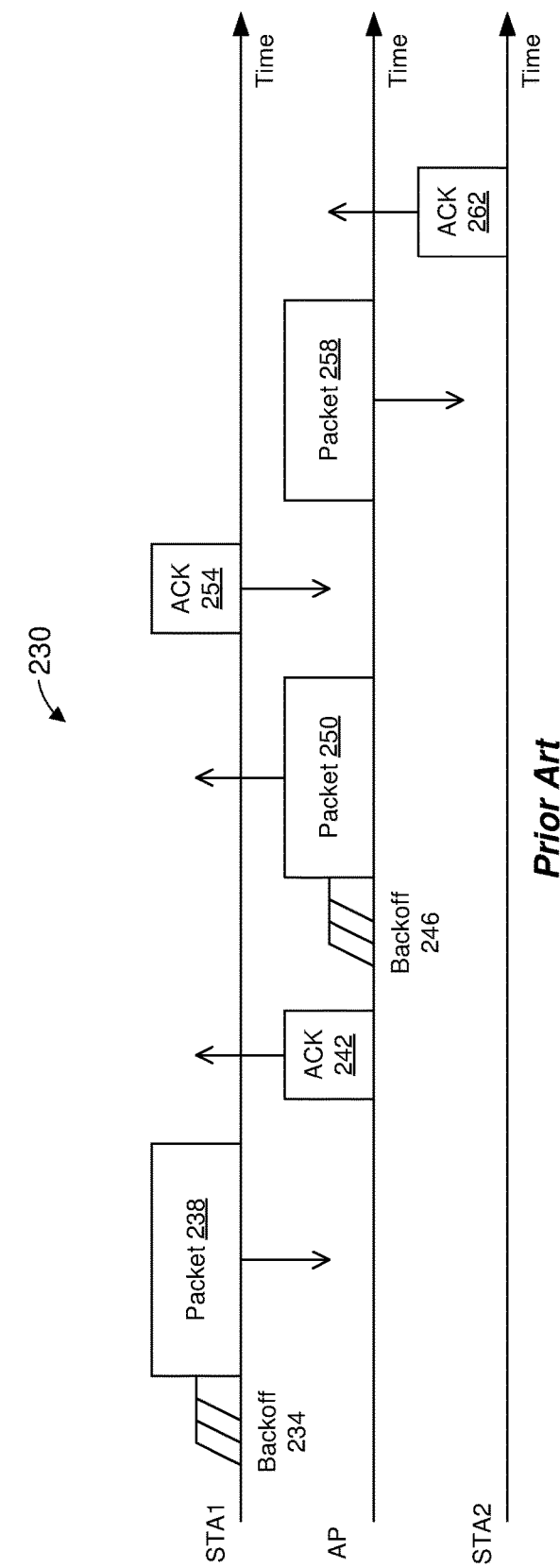
FIG. 2B is a timing diagram of an example half-duplex communication exchange in the WLAN of FIG. 2A.

FIG. 2B is a timing diagram of an example half-duplex communication exchange 230 in the WLAN 200 of FIG. 2A. The client station 208 performs a backoff operation 234 and then transmits a PHY protocol data unit (PPDU) 238 to the AP 204. In an embodiment, the backoff operation 234 comprises performing a clear channel assessment (CCA) to determine whether the channel is busy.

A suitable time period (e.g., a short interframe space (SIFS) as defined by the IEEE 802.11 Standard or another suitable time period) after an end of the PPDU 238, the AP 204 transmits to the client station 208 a PPDU 242 that includes an acknowledgement (ACK) of the PPDU 238.

Next, the AP 204 performs a backoff operation 246 (e.g., to determine that the channel is not busy) and then transmits a PPDU 250 to the client station 208. A suitable time period (e.g., SIFS or another suitable time period) after an end of the PPDU 250, the client station 208 transmits to the AP 204 a PPDU 254 that includes an ACK of the PPDU 250.

Next, the AP 204 transmits a PPDU 258 to the client station 212. A suitable time period (e.g., SIFS or another suitable time period) after an end of the PPDU 258, the client station 212 transmits to the AP 204 a PPDU 262 that includes an ACK of the PPDU 258.

Figure 2C:
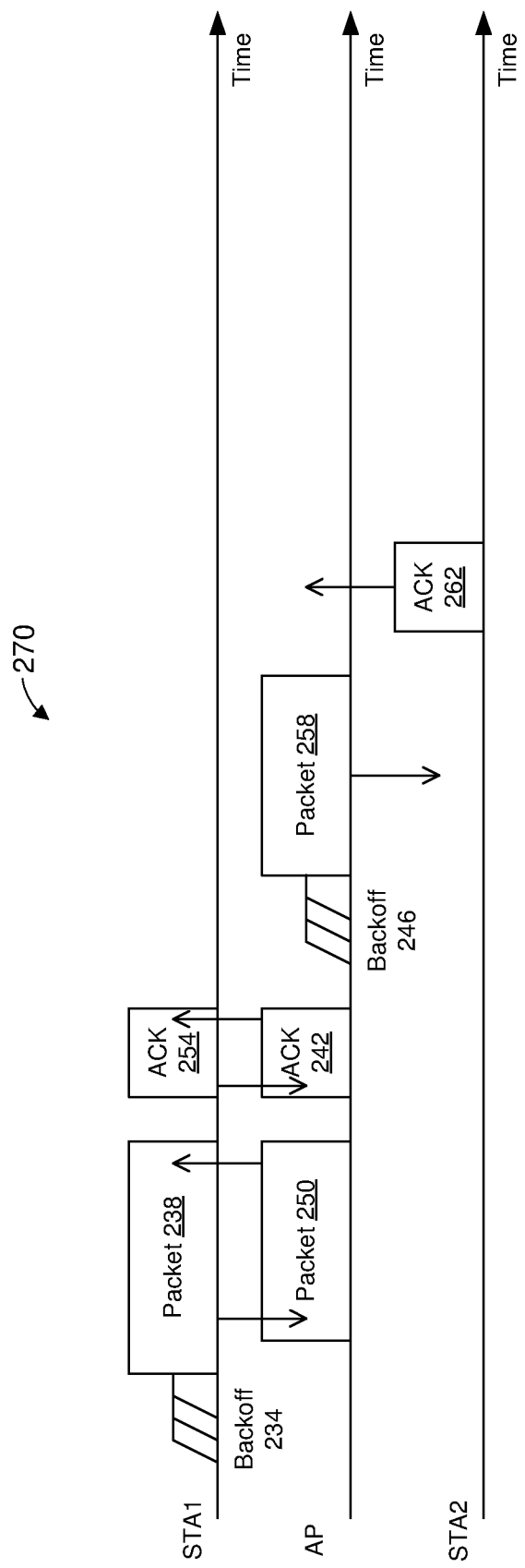
FIG. 2C is a timing diagram of an example duplex communication exchange in the WLAN of FIG. 2A, according to an embodiment.

FIG. 2C is a timing diagram of an example duplex communication exchange 270 in the WLAN 200 of FIG. 2A, according to an embodiment. The same PPDUs transmitting in the communication exchange 230 of FIG. 2B are transmitted in the communication exchange 270 of FIG. 2C, but duplex communication techniques are employed in the communication exchange 270, which results in less time required to complete the communication exchange 270 as compared to the communication exchange 230.

The client station 208 performs the backoff operation 234 (e.g., to determine that a channel is not busy) and then transmits the PPDU 238 to the AP 204. The AP 204 determines that duplex communication to the client station 208 during reception of the PPDU 238 can be performed, and thus transmits the PPDU 250 to the client station 208 simultaneous with reception of the PPDU 238.

A suitable time period (e.g., SIFS or another suitable time period) after an end of the PPDU 238, the AP 204 transmits to the client station 208 the PPDU 242 which includes an ACK of the PPDU 238. Similarly, a suitable time period (e.g., SIFS or another suitable time period) after an end of the PPDU 250, the client station 208 transmits to the AP 204 the PPDU 254 which includes an ACK of the PPDU 250. The AP 204 transmits the PPDU 242 simultaneous with reception of the PPDU 254, and the client station 208 transmits the PPDU 254 simultaneous with reception of the PPDU 242.

Next, the AP 204 performs the backoff operation 246 (e.g., to determine that the channel is not busy) and then transmits the PPDU 258 to the client station 212. A suitable time period (e.g., SIFS or another suitable time period) after an end of the PPDU 258, the client station 212 transmits to the AP 204 the PPDU 262 that includes an ACK of the PPDU 258.

As can be seen when comparing FIGS. 2B and 2C, simultaneous transmission of the PPDUs 238 and 250, and simultaneous transmission of the PPDUs 242 and 254 results in the communication exchange 270 taking considerably less time than the communication exchange 230. Thus, duplex communication techniques can improve overall system efficiency by increasing the amount of information that can be exchanged in a given amount of time.

In an embodiment, communication devices in a network exchange capability information that indicates whether the communication devices are configured to utilize duplex communication techniques. For example, the AP 114 (FIG. 1) exchanges capability information with each of the client stations 154.

A transmission opportunity period (TXOP) established by a first communication device that is capable of duplex communications and during which the first communication device communicates with a second communication device that is also capable of duplex communications, and during which the first communication device permits duplex communications, is sometimes referred to herein as a "duplex TXOP". A TXOP is an interval of time during which a first communication device (sometimes referred to herein as a "TXOP holder" or "TXOP initiator") has a right to initiate frame exchanges, according to an embodiment. A communication device that transmits during a TXOP in response to a transmission from the TXOP initiator is sometimes referred to herein as a "TXOP responder". The TXOP initiator optionally establishes a TXOP by transmitting a request-to-send (RTS) frame to another communication device, and receiving a clear-to-send (CTS) frame from the other communication device, according to an embodiment. The TXOP initiator optionally establishes a TXOP by broadcasting a CTS-to-self frame, according to an embodiment. In other embodiments, the TXOP initiator establishes a TXOP using other suitable techniques.

In some embodiments, the TXOP initiator signals to a TXOP responder that the TXOP responder is permitted to perform a duplex transmission during the TXOP. For example, in some embodiments, the TXOP initiator transmits a first packet to the TXOP responder that includes duplex transmission permission information that indicates that the TXOP responder is permitted to perform a duplex transmission in the future during the TXOP and while the TXOP initiator transmits a second packet after transmission of the first packet. The TXOP responder uses the duplex transmission permission information in the first packet to determine that the TXOP responder is permitted to perform the duplex transmission during the TXOP and while the TXOP initiator transmits the second packet, which the TXOP initiator transmits after transmitting the first packet.

As another example, in some embodiments, the TXOP initiator includes, in a packet transmitted during the TXOP, duplex transmission permission information that indicates that the TXOP responder is permitted to perform a duplex transmission during the TXOP and while the TXOP initiator transmits the packet. The TXOP responder uses the indication in the packet to determine that the TXOP responder is permitted to perform the duplex transmission during the TXOP and while the TXOP initiator transmits the packet.

In some embodiments, the TXOP responder determines whether the TXOP responder has buffered data that is to be transmitted to the TXOP initiator, and determines whether the TXOP responder should perform a duplex transmission to the TXOP initiator based on whether the TXOP responder has buffered data that is to be transmitted to the TXOP initiator. In some embodiments in which the TXOP responder is an AP and does not have buffered data that is to be transmitted to the TXOP initiator, the TXOP responder is permitted to perform a duplex transmission to a third communication device different than the TXOP initiator.

Figure 3A:
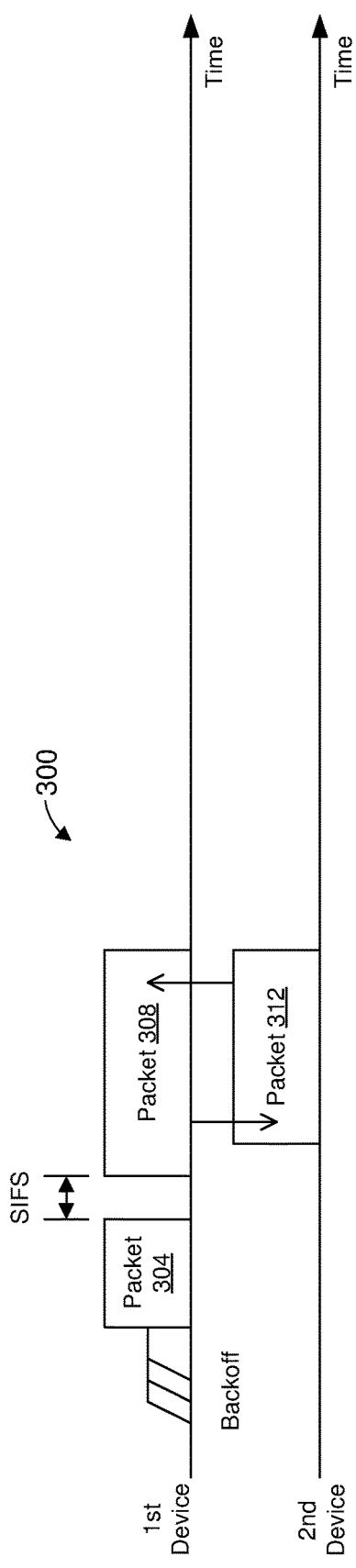
FIG. 3A is a timing diagram of an example duplex communication exchange, according to an embodiment.

FIG. 3A is a timing diagram of an example duplex communication exchange 300, according to an embodiment. A first communication device (e.g., a TXOP initiator) transmits a first packet 304 to a second communication device (e.g., a TXOP responder). The first packet 304 includes a frame (e.g., a MAC layer data unit) having an indication that a duplex transmission is permitted in the future while the first communication device transmits a second packet 308 after transmission of the first packet 304. In an embodiment, the frame includes a MAC header with a receiver address field having a network address (e.g., a MAC address) of the second communication device. In an embodiment, the indication that the duplex transmission is permitted while the first communication device transmits the second packet 308 also indicates that transmission of the second packet 308 will begin a defined time period after an end of the transmission of the first packet 304. In an embodiment, the defined time period is SIFS or another suitable time period.

Upon receiving the first packet 304, the second communication device determines that the second communication device is permitted to perform a duplex transmission while the first communication device transmits the second packet 308, using the indication (that the duplex transmission is permitted) in the first packet 304. In response to determining that the second communication device is permitted to perform the duplex transmission while the first communication device transmits the second packet 308, the second communication device transmits a third packet 312 while the first communication device transmits the second packet 308. In an embodiment, the second communication device transmits the third packet 312 to the first communication device. In another embodiment, the second communication device transmits the third packet 312 to a third communication device (not shown in FIG. 3A).

Figure 3B:
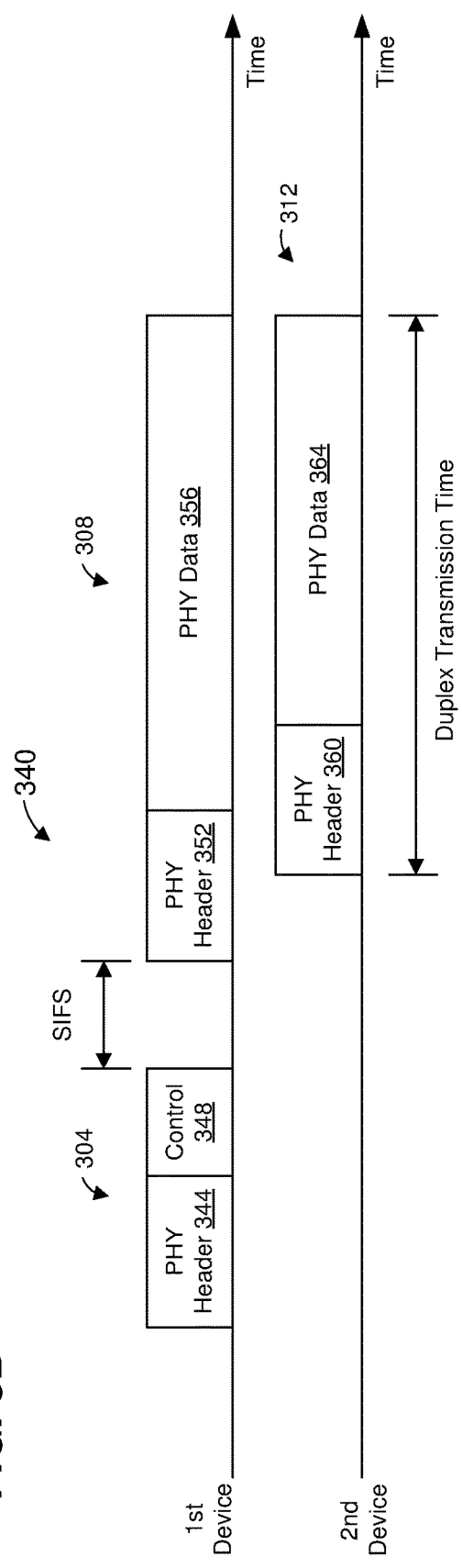
FIG. 3B is a more detailed timing diagram of the example duplex communication exchange of FIG. 3A, according to an embodiment.

FIG. 3B is a more detailed diagram 340 of the example duplex communication exchange 300 of FIG. 3A, according to an embodiment. The first packet 304 includes a PHY header 344 and a frame 348. In an embodiment, the frame 348 is a control frame. In another embodiment, the frame is a data frame, a management frame, or another suitable type of frame. The frame 348 includes a MAC header with a receiver address field having a network address (e.g., a MAC address) of the second communication device. The frame 348 also includes the indication that the duplex transmission is permitted while the first communication device transmits the second packet 308.

Upon decoding and processing the frame 348, the second communication device determines that the second communication device is permitted to perform a duplex transmission while the first communication device transmits the second packet 308.

The second packet 308 includes a PHY header 352 and a PHY data portion 356. The PHY header 352 includes a field that indicates a duration of the second packet 308. In an embodiment, the field that indicates a duration of the second packet 308 is included in a first occurring portion (e.g., a legacy portion) of the PHY header 352, and thus the second communication device is able to decode and process the field and determine the duration of the second packet 308 prior to receiving the entire PHY header 352.

In an embodiment, the duplex transmission (e.g., the third packet 312) is required to end prior to an end of the second packet 308. In another embodiment, the duplex transmission (e.g., the third packet 312) is required to be end prior to, or at the same time as, the end of the second packet 308. In another embodiment, the duplex transmission (e.g., the third packet 312) is required to be end at approximately the same time as the end of the second packet 308 (e.g., within 1% of the defined time period (e.g., SIFS), within 2% of the defined time period, within 5% of the defined time period, within 10% of the defined time period, etc.). In embodiments in which the duplex transmission (e.g., the third packet 312) is required to be end prior to, at the same time as, or approximately the same time as the end of the second packet 308, the second communication device uses the determined duration of the second packet 308 to generate the third packet 312 to have a suitable duration.

After determining the duration of the second packet 308, the second communication device begins transmitting the third packet 312 while the first communication device is transmitting the second packet 308. The third packet 312 includes a PHY header 360 and a PHY data portion 364.

Figure 3C:
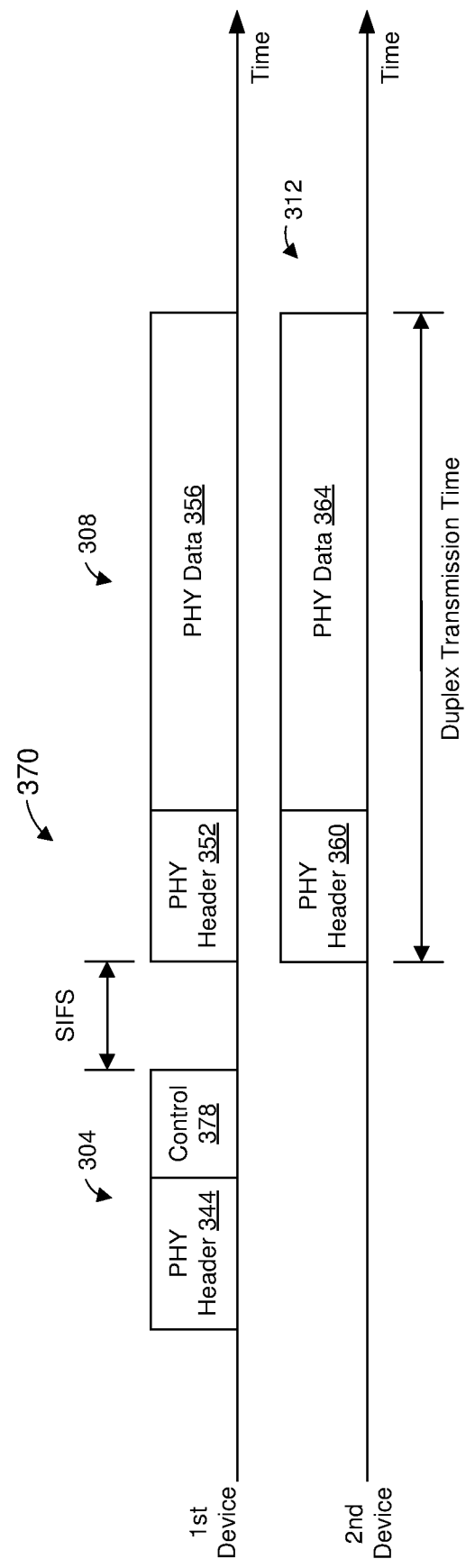
FIG. 3C more detailed timing diagram of the example duplex communication exchange of FIG. 3A, according to another embodiment.

FIG. 3C is a more detailed diagram 370 of the example duplex communication exchange 300 of FIG. 3A, according to another embodiment. The first packet 304 includes the PHY header 344 and a frame 378. In an embodiment, the frame 378 is a control frame. In another embodiment, the frame is a data frame, a management frame, or another suitable type of frame. The frame 378 includes a MAC header with a receiver address field having a network address (e.g., a MAC address) of the second communication device. The frame 378 also includes the indication that the duplex transmission is permitted while the first communication device transmits the second packet 308. The frame 378 further includes an indication of the duration of the second packet 308.

Upon decoding and processing the frame 378, the second communication device determines i) that the second communication device is permitted to perform a duplex transmission while the first communication device transmits the second packet 308, and ii) the duration of the second packet 308.

In embodiments in which the duplex transmission (e.g., the third packet 312) is required to be end prior to, at the same time as, or approximately the same time as the end of the second packet 308, the second communication device uses the determined duration of the second packet 308 to generate the third packet 312 to have a suitable duration.

After the defined time period (e.g., SIFS) after the end of the first packet 304, the second communication device begins transmitting the third packet 312 while the first communication device is transmitting the second packet 308. In an embodiment, the second communication device begins transmitting the third packet 312 at approximately the same time as the beginning of the reception of the second packet 308 (e.g., within 1% of the defined time period (e.g., SIFS), within 2% of the defined time period, within 5% of the defined time period, within 10% of the defined time period, etc.).

Referring now to FIGS. 3B and 3C, if the packet 304 includes an A-MPDU that comprises multiple frames, the frame 348/378 is a first occurring frame in the A-MPDU (e.g., the frame 348/378 is transmitted prior to transmitting all other frames in the A-MPDU), according to an embodiment.

Figure 4:
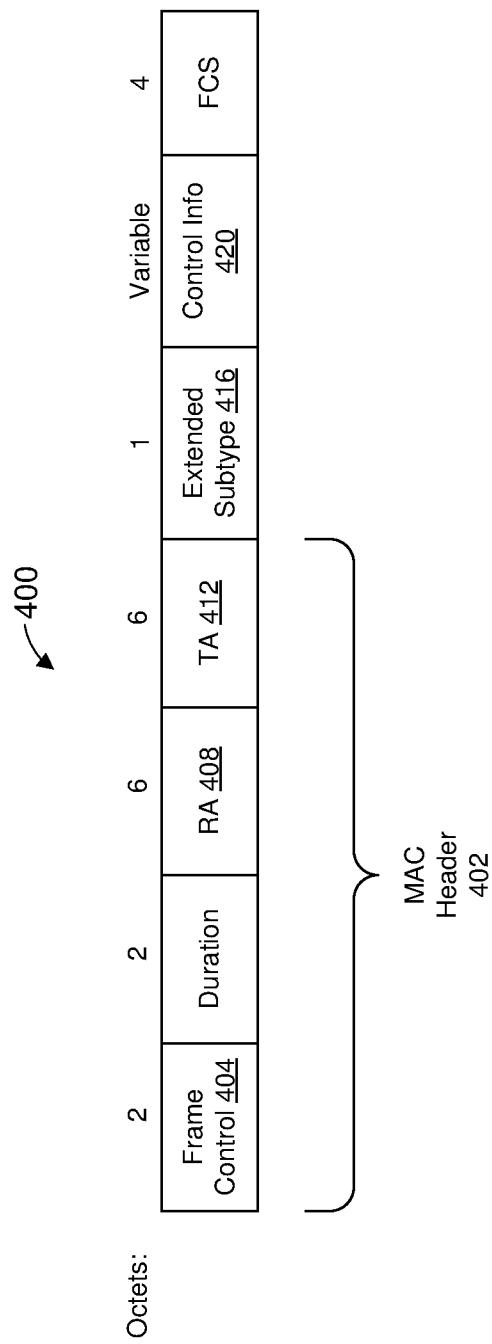
FIG. 4 is a diagram of an example control frame that includes an indication that a duplex transmission is permitted, according to an embodiment.

FIG. 4 is a diagram of an example control frame 400 that is utilized as the frame 348/378 (FIGS. 3B and 3C), according to some embodiments. The network interface 122 (FIG. 1) is configured to (e.g., the MAC processor 126 is configured to) generate the control frame 400, according to an embodiment. Additionally or alternatively, the network interface 162 (FIG. 1) is configured to (e.g., the MAC processor 166 is configured to) generate the control frame 400, according to an embodiment. FIG. 4 illustrates example lengths of fields and an example arrangement of fields. In other embodiments, the fields illustrated in FIG. 4 have other suitable lengths, and/or the fields have another suitable arrangement. In some embodiments, additional fields are included and/or one or more of the fields illustrated in FIG. 4 are omitted.

The control frame 400 comprises a MAC header 402 having multiple fields including a frame control field 404, a receiver address (RA) field 408, and a transmitter address (TA) field 412. In some embodiments, additional fields are included in the MAC header 402 and/or one or more of the fields of the MAC header 402 illustrated in FIG. 4 are omitted.

The frame control field 404 includes a type subfield (not shown) set to a value that indicates the control frame 400 is a "control" type frame. The frame control field 404 also includes a subtype subfield (not shown) set to a value that indicates the control frame 400 is a subtype (e.g., an "extended control" subtype) of a control-type frame that includes information regarding duplex transmissions. When the type subfield is set to the value that indicates the control frame 400 is a "control" type frame, and the subtype subfield is set to the value that indicates the control frame 400 is the subtype (e.g., an "extended control" subtype) that includes information regarding duplex transmissions, this signals to receivers that the control frame 400 has the structure illustrated in FIG. 4. Additionally, when the type subfield is set to the value that indicates the control frame 400 is a "control" type frame, and the subtype subfield is set to the value that indicates the control frame 400 is the subtype (e.g., an "extended control" subtype) that includes information regarding duplex transmissions, this signals to receivers that another packet (e.g., the second packet 308 (FIGS. 3A-C) will follow the first packet 304 after the defined time period (e.g., SIFS or another suitable time period).

In an embodiment, the RA field 408 is set to a network address (e.g., a MAC address) of the second communication device, and the TA field 412 is set to a network address (e.g., a MAC address) of the first communication device.

The control frame 400 also comprises an extended subtype information field 416. In an embodiment, the indication that the duplex transmission is permitted while the first communication device transmits the second packet 308 is included in the extended subtype information field 416. In an embodiment, the control frame 400 also comprises a control information field 420. In an embodiment, an indication of a duration of the second packet 308 is included in the control information field 420. In another embodiment, the indication of the duration of the second packet 308 is included in the extended subtype information field 416. In another embodiment, the control frame 400 does not include the indication of the duration of the second packet 308.

The second communication device analyzes the control frame 400 to determine whether the second communication device is permitted to perform a duplex transmission. For example, the second communication device determines whether the RA field 408 is set to the network address of (e.g., the MAC address of) the second communication device, and determines whether the extended subtype information field 416 includes the indication that the duplex transmission is permitted, according to some embodiments. As another example, the second communication device determines a duration of the second packet 308 using information included in the control frame 400 (e.g., in the control information field 420 or the extended subtype information field 416), according to some embodiments. The network interface 122 (FIG. 1) is configured to (e.g., the MAC processor 126 is configured to) analyze the control frame 400 to determine whether the AP 114 is permitted to perform a duplex transmission, according to an embodiment. Additionally or alternatively, the network interface 162 (FIG. 1) is configured to (e.g., the MAC processor 166 is configured to) analyze the control frame 400 to determine whether the client station 154-1 is permitted to perform a duplex transmission, according to an embodiment.

Figure 5:
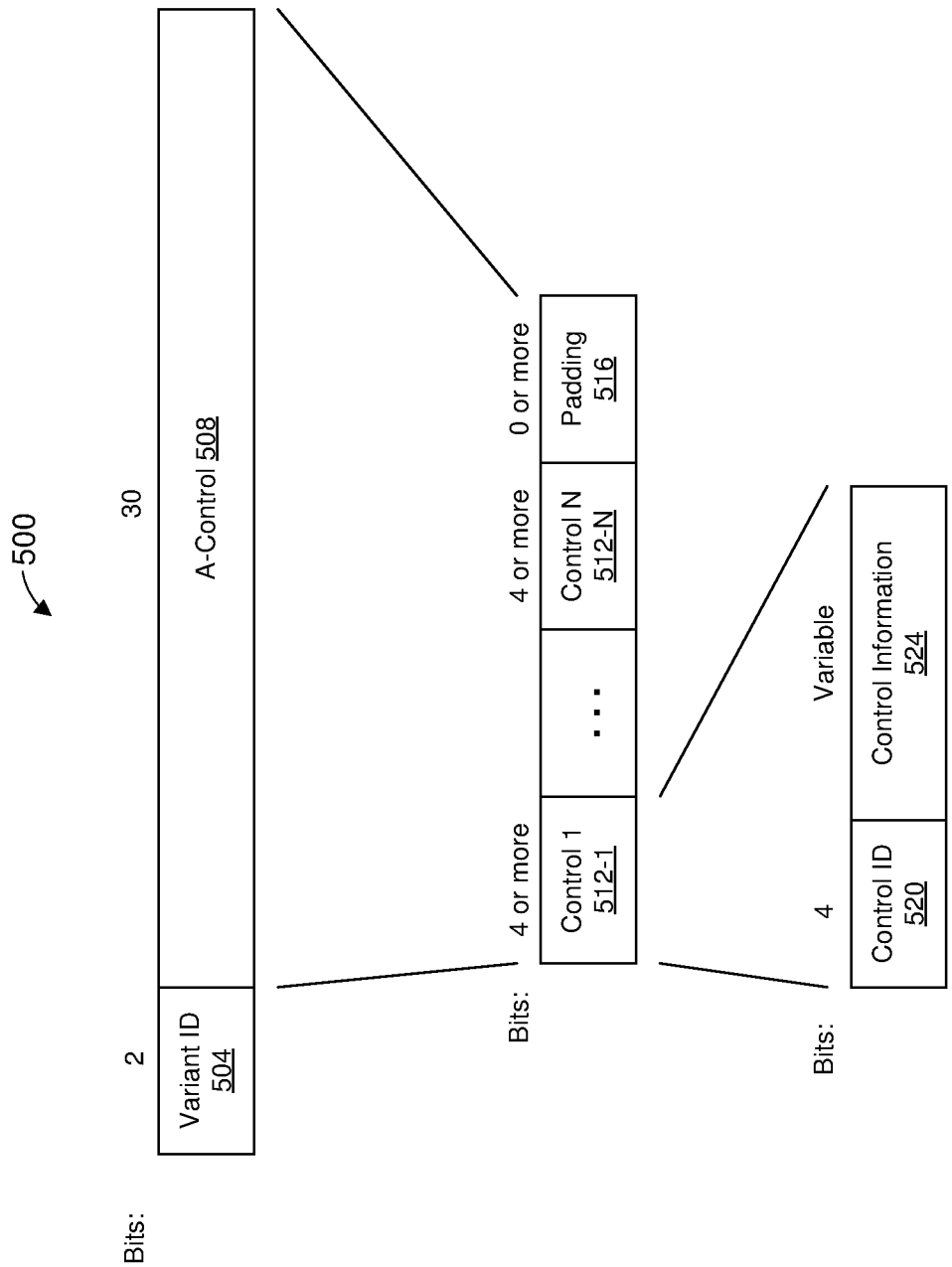
FIG. 5 is a diagram of an example control field, included in a media access control layer header, that includes an indication that a duplex transmission is permitted, according to an embodiment.

FIG. 5 is a diagram of an example field 500 that is included in a MAC header of the frame 348/378 (FIGS. 3B and 3C), according to some embodiments. The network interface 122 (FIG. 1) is configured to (e.g., the MAC processor 126 is configured to) generate the frame 348/378, which includes the MAC header having the field 500, according to an embodiment. Additionally or alternatively, the network interface 162 (FIG. 1) is configured to (e.g., the MAC processor 166 is configured to) generate the frame 348/378, which includes the MAC header having the field 500, according to an embodiment. FIG. 5 illustrates example lengths of subfields and an example arrangement of subfields. In other embodiments, the subfields illustrated in FIG. 5 have other suitable lengths, and/or the subfields have another suitable arrangement. In some embodiments, additional subfields are included and/or one or more of the subfields illustrated in FIG. 5 are omitted.

In an embodiment, the MAC header of the frame 348/378 includes an RA field (similar to the RA field 408 of FIG. 4) set to the network address (e.g., a MAC address) of the second communication device.

In an embodiment, the field 500 in the MAC header of the frame 348/378 is a high throughput (HT) control field similar to the HT control field defined by the IEEE 802.11 Standard. The field 500 includes a variant identifier (ID) subfield 504 and an aggregated control (A-control) subfield 508. In an embodiment, the variant ID subfield 504 is set to a binary value 11 (or another suitable value) to indicate that the HT control field 500 is a high efficiency (HE) variant HT control field.

The A-control subfield 508 includes one or more control subfields 512 and a padding field 516. In an embodiment, each control subfield 512 includes a control ID subfield 520 and a control information subfield 524. In an embodiment, the content and length of the control information subfield 524 varies depending on the value in the control ID subfield 520. In an embodiment, the control ID subfield 520 of one of the control subfields 512 is set to the value seven (or another suitable value) to indicate that the control information subfield 524 includes duplex transmission information.

In an embodiment, the indication that the duplex transmission is permitted while the first communication device transmits the second packet 308 is included in the control information subfield 524. In an embodiment, an indication of a duration of the second packet 308 is also included in the control information subfield 524.

Referring again to FIGS. 3A-C, in other embodiments, the indication that the duplex transmission is permitted while the first communication device transmits the second packet 308 is not included in a frame within a PHY data portion of the first packet 304, but is instead included in the PHY header 344 of the first packet 304. For example, the IEEE 802.11 Standard defines a signal field HE-SIG-A having multiple reserved bits, and one of the reserved bits is redefined to indicate whether a duplex transmission is permitted, according to an embodiment. In other embodiments, the indication that the duplex transmission is permitted while the first communication device transmits the second packet 308 is included in another suitable location in the PHY header 344 of the first packet 304.

Figure 6A:
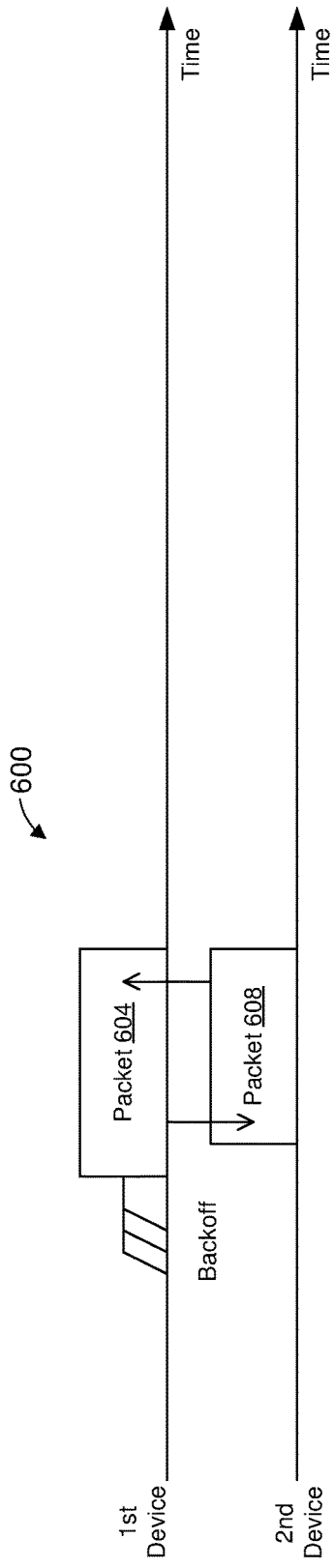
FIG. 6A is a timing diagram of another example duplex communication exchange, according to another embodiment.

FIG. 6A is a timing diagram of another example duplex communication exchange 600, according to another embodiment. A first communication device (e.g., a TXOP initiator) transmits a first packet 604 to a second communication device (e.g., a TXOP responder). The first packet 604 includes an indication that a duplex transmission is permitted while the first communication device transmits the first packet 604. In an embodiment, a frame within a PHY data portion of the first packet 604 includes a MAC header with a receiver address field having a network address (e.g., a MAC address) of the second communication device.

Upon receiving the first packet 604, the second communication device determines that the second communication device is permitted to perform a duplex transmission while the first communication device transmits the first packet 604, using the indication (that the duplex transmission is permitted) in the first packet 604. In response to determining that the second communication device is permitted to perform the duplex transmission while the first communication device transmits the first packet 604, the second communication device transmits a second packet 612 while the first communication device transmits the first packet 604. In an embodiment, the second communication device transmits the second packet 608 to the first communication device. In another embodiment, the second communication device transmits the second packet 608 to a third communication device (not shown in FIG. 6A).

In some embodiments, the indication that the duplex transmission is permitted is included in a frame within a PHY data portion of the first packet 604. In some embodiments, the indication that the duplex transmission is permitted is included in a PHY header of the first packet 604.

Figure 6B:
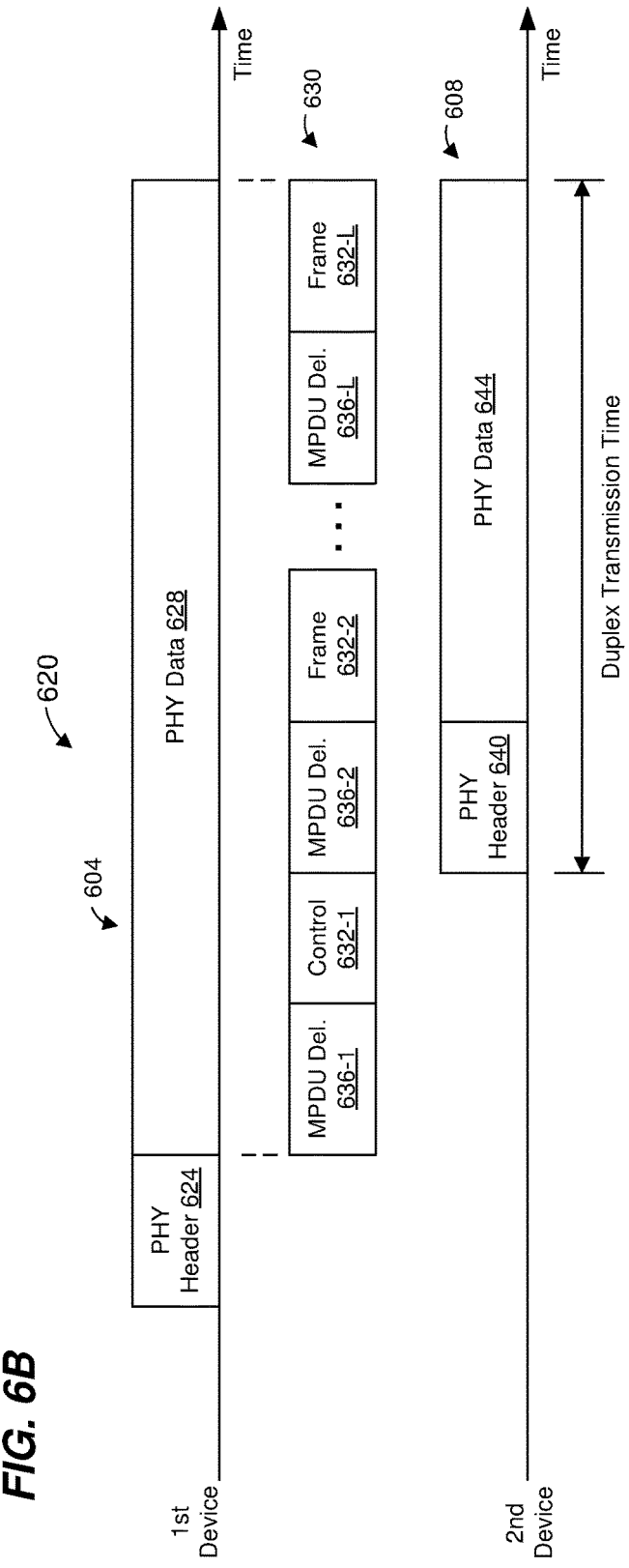
FIG. 6B is a more detailed timing diagram of the example duplex communication exchange of FIG. 6A, according to an embodiment.

FIG. 6B is a more detailed diagram 620 of the example duplex communication exchange 600 of FIG. 6A, according to an embodiment. The first packet 604 includes a PHY header 624 and a PHY data portion 628. The PHY data portion 628 includes an A-MPDU 630. The A-MPDU 630 includes L frames 632 with associated MPDU delimiters 636, where L is a suitable positive integer. The frame 632-1 is a control frame. In an embodiment, the control frame 632-1 is required to be a first occurring frame in the A-MPDU 630 (e.g., the control frame 632-1 is required to be transmitted prior to transmitting all other frames 632), according to an embodiment.

The control frame 632-1 includes a MAC header with a receiver address field having a network address (e.g., a MAC address) of the second communication device. The control frame 632-1 also includes the indication that the duplex transmission is permitted while the first communication device transmits the first packet 604. In an embodiment, the control frame 632-1 is the control frame 400 of FIG. 4. In other embodiments, the control frame 632-1 is another suitable control frame that includes the indication that the duplex transmission is permitted.

Upon decoding and processing the control frame 632-1, the second communication device determines that the second communication device is permitted to perform a duplex transmission while the first communication device transmits the first packet 604.

The PHY header 624 includes a field that indicates a duration of the first packet 604. In an embodiment, the second communication device processes the field in the PHY header 624 that indicates the duration of the first packet 604 to determine the duration of the first packet 604.

The MAC header of the control frame 632-1 includes a duration field that indicates a duration of the first packet 604. In an embodiment, the second communication device processes the duration field in the MAC header 624 of the control frame 632-1 to determine the duration of the first packet 604.

In an embodiment, the duplex transmission (e.g., the second packet 608) is required to end prior to an end of the first packet 604. In another embodiment, the duplex transmission (e.g., the second packet 608) is required to be end prior to, or at the same time as, the end of the first packet 604. In another embodiment, the duplex transmission (e.g., the second packet 608) is required to be end at approximately the same time as the end of the first packet 604 (e.g., within 1% of the defined time period (e.g., SIFS), within 2% of the defined time period, within 5% of the defined time period, within 10% of the defined time period, etc.). In embodiments in which the duplex transmission (e.g., the second packet 608) is required to be end prior to, at the same time as, or approximately the same time as the end of the first packet 604, the second communication device uses the determined duration of the first packet 604 to generate the second packet 608 to have a suitable duration.

After determining i) that the duplex transmission is permitted, and ii) the duration of the first packet 604, the second communication device begins transmitting the second packet 608 while the first communication device is transmitting the first packet 604. The second packet 608 includes a PHY header 640 and a PHY data portion 644. In some embodiments, determination of the duration of the first packet 604 is not required to perform the duplex transmission.

Figure 6C:
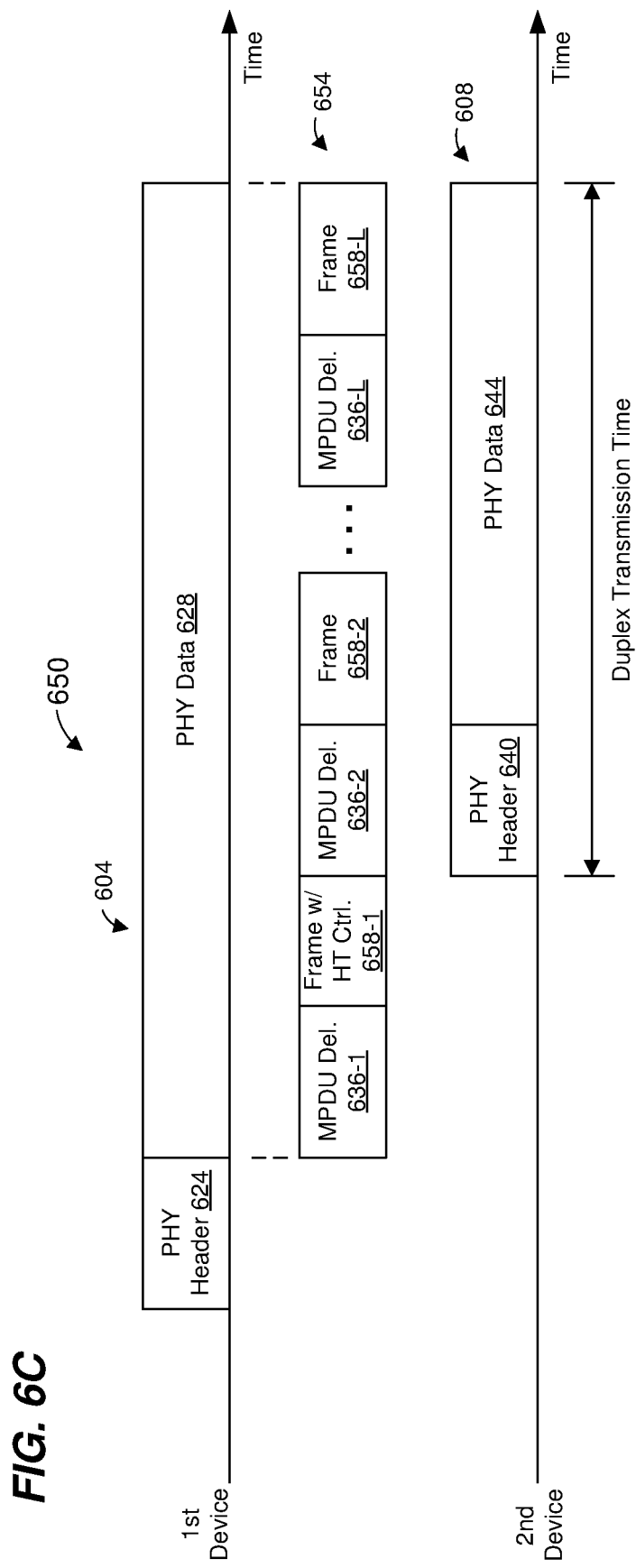
FIG. 6C more detailed timing diagram of the example duplex communication exchange of FIG. 6A, according to another embodiment.

FIG. 6C is a more detailed diagram 650 of the example duplex communication exchange 600 of FIG. 6A, according to another embodiment. The first packet 604 includes an A-MPDU 654. The A-MPDU 630 includes L frames 658 with associated MPDU delimiters 636, where L is a suitable positive integer. The frame 658-1 includes a MAC header that includes a control field that includes the indication that the duplex transmission is permitted. In an embodiment, the frame 658-1 is required to be a first occurring frame in the A-MPDU 654 (e.g., the frame 658-1 is required to be transmitted prior to transmitting all other frames 658), according to an embodiment.

In an embodiment, the control field in the MAC header of the frame 658-1 is the control field 500 of FIG. 5. In other embodiments, the control field in the MAC header of the frame 658-1 is another suitable control field having the indication that the duplex transmission is permitted.

The PHY header 624 includes a field that indicates a duration of the first packet 604. In an embodiment, the second communication device processes the field in the PHY header 624 that indicates the duration of the first packet 604 to determine the duration of the first packet 604.

The MAC header of the frame 658-1 includes a duration field that indicates a duration of the first packet 604. In an embodiment, the second communication device processes the duration field in the MAC header of the frame 658-1 to determine the duration of the first packet 604.

After determining i) that the duplex transmission is permitted, and ii) the duration of the first packet 604, the second communication device begins transmitting the second packet 608 while the first communication device is transmitting the first packet 604. In some embodiments, determination of the duration of the first packet 604 is not required to perform the duplex transmission.

Figure 6D:
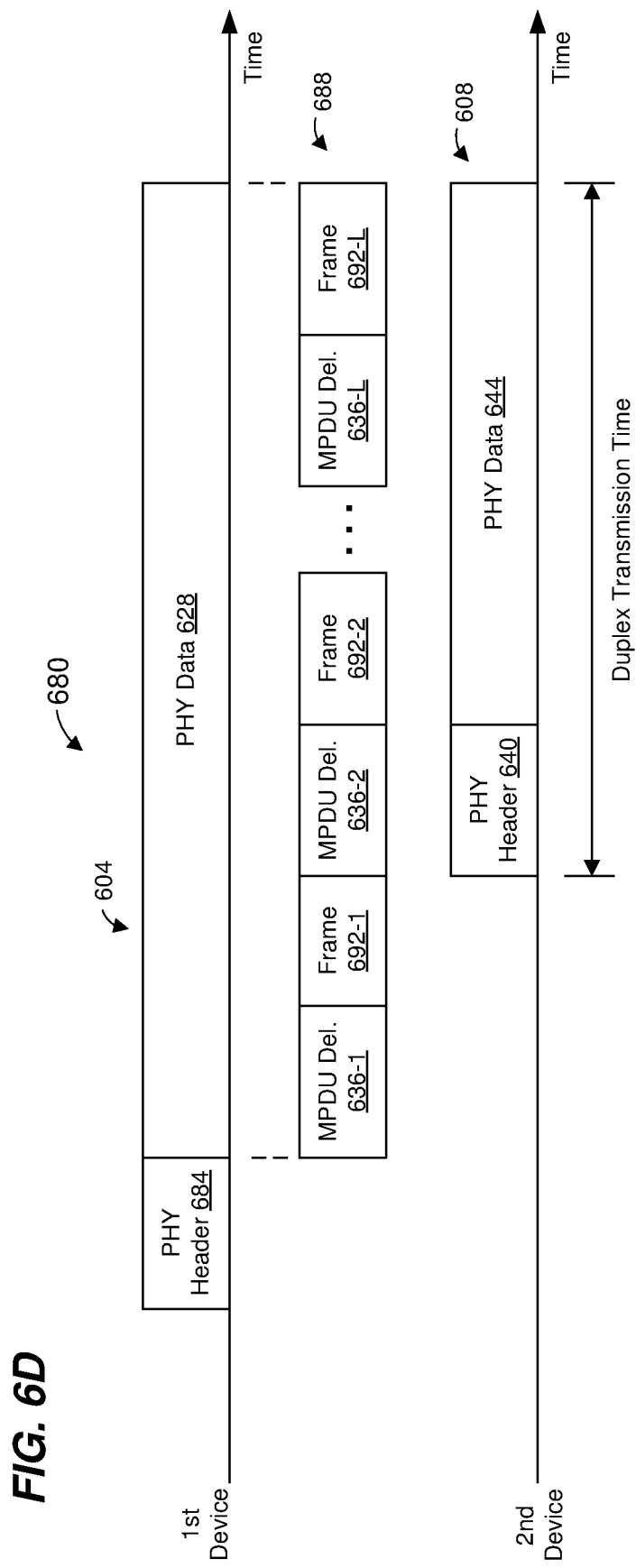
FIG. 6D more detailed tinning diagram of the example duplex communication exchange of FIG. 6A, according to another embodiment.

FIG. 6D is a more detailed diagram 680 of the example duplex communication exchange 600 of FIG. 6A, according to another embodiment. The indication that a duplex transmission is permitted is not included in the PHY data portion 628 but rather in a PHY header 684 of the first packet 604. For example, the IEEE 802.11 Standard defines a signal field HE-SIG-A having multiple reserved bits, and one of the reserved bits is redefined to indicate whether a duplex transmission is permitted, according to an embodiment. In other embodiments, the indication that the duplex transmission is permitted is included in another suitable location in the PHY header 684 of the first packet 604.

The PHY data portion 628 includes an A-MPDU 688. The A-MPDU 688 includes L frames 692 with associated MPDU delimiters 636, where L is a suitable positive integer. The first occurring frame 692-1 includes a MAC header. The MAC header of the frame 692-1 includes a field (e.g., an RA field) that indicates a network address (e.g., a MAC address) of an intended recipient of the A-MPDU 688.

In an embodiment, the second communication device processes i) the PHY header 684, and ii) the MAC header of the frame 692-1 to determine whether a duplex transmission is permitted.

In an embodiment, the MAC header of the frame 692-1 includes a duration field that indicates a duration of the first packet 604. In an embodiment, the second communication device processes the duration field in the MAC header of the frame 692-1 to determine the duration of the first packet 604.

The PHY header 684 includes a field that indicates a duration of the first packet 604. In an embodiment, the second communication device processes the field in the PHY header 684 that indicates the duration of the first packet 604 to determine the duration of the first packet 604.

After determining i) that the duplex transmission is permitted, and ii) the duration of the first packet 604, the second communication device begins transmitting the second packet 608 while the first communication device is transmitting the first packet 604. In some embodiments, determination of the duration of the first packet 604 is not required to perform the duplex transmission.

FIG. 7 is a timing diagram of another example duplex communication exchange 700, according to another embodiment. A first client station (STA1) transmits a first packet 704 to an AP. The first packet 704 includes an indication that a duplex transmission is permitted while STA1 transmits the first packet 704. In another embodiment, a previous packet (not shown) transmitted by STA1 includes the indication that a duplex transmission is permitted while STA1 transmits the first packet 704.

The AP determines, based on the indication that a duplex transmission is permitted, that the AP can transmit a second packet 708 while the first packet 704 is being transmitted. Additionally, the AP has buffered data that is to be transmitted to STA1. In an embodiment, the MAC processor 126 (FIG. 1) includes, or is coupled to, a memory device that stores data that is to be transmitted to one or more client stations 154, and the buffered data that is to be transmitted to STA1 is stored in the memory device. In response to i) determining that a duplex transmission is permitted and ii) determining that the AP has buffered data that is to be transmitted to STA1, the AP determines to transmit the second packet 708 to STA1, where the second packet 708 includes data that was buffered at the AP.

In some embodiments, different classes of data (e.g., corresponding to different priorities, different latency requirements, etc.) are stored in respective buffers in the memory device. The different classes of data are sometimes described as corresponding to different traffic identifiers (TIDs), and different buffers correspond to different TIDs. In an embodiment, the second packet 708 is permitted to include data corresponding to multiple TIDs.

After a suitable time duration (e.g., SIFS or another suitable time duration) after an end of the packet 704, the AP transmits an acknowledgment packet 712 to STA1.

STA1 transmits a third packet 716 to the AP. The third packet 716 includes an indication that a duplex transmission is permitted while STA1 transmits the third packet 716. In another embodiment, a previous packet (not shown) transmitted by STA1 includes the indication that a duplex transmission is permitted while STA1 transmits the third packet 716.

The AP determines, based on the indication that a duplex transmission is permitted, that the AP can transmit a fourth packet 720 while the third packet 716 is being transmitted. Additionally, the AP does not have buffered data that is to be transmitted to STA1. However, the AP has buffered data that is to be transmitted to another client station (STA2). In an embodiment, the buffered data that is to be transmitted to STA2 is stored in the memory device that is included in, or coupled to, the MAC processor 126 (FIG. 1). In response to i) determining that a duplex transmission is permitted and ii) determining that the AP has buffered data that is to be transmitted to STA2, the AP determines to transmit the fourth packet 720 to STA2, where the fourth packet 720 includes data that was buffered at the AP.

In an embodiment, the fourth packet 720 is permitted to include data corresponding to multiple TIDs.

After a suitable time duration (e.g., SIFS or another suitable time duration) after an end of the third packet 716, the AP transmits an acknowledgment packet 724 to STA1. Additionally, while transmitting the acknowledgment packet 724 to STA1, the AP receives an acknowledgment packet 728 from STA2, where STA2 began transmitting the acknowledgment packet 728 a suitable time duration (e.g., SIFS or another suitable time duration) after an end of reception of the fourth packet 720. In some embodiments, the AP does not receive the acknowledgment packet 728 from STA2 while transmitting the acknowledgment packet 724 to STA1.

The indications that duplex transmissions are permitted in the packet 704 and the packet 708 (or in previous packets not shown in FIG. 7) are in PHY headers of the packets, or in frames included in the packets (e.g., in MAC headers included in the frames, or in MAC data portions in the frames), in various embodiments. In some embodiments, the indications that duplex transmissions are permitted are included in control frames such as the control frame 400 of FIG. 4, or in a field of MAC headers such as the control field 500 of FIG. 5.

FIG. 8 is a timing diagram of another example duplex communication exchange 800, according to another embodiment. An access point (AP1) transmits a first packet 804 to a first client station (STA1). The first packet 804 includes an indication that a duplex transmission is permitted while the AP1 transmits the first packet 804. In another embodiment, a previous packet (not shown) transmitted by AP1 includes the indication that a duplex transmission is permitted while AP1 transmits the first packet 804. AP1 manages a first wireless network to which STA1 belongs.

STA1 determines, based on the indication that a duplex transmission is permitted, that STA1 can transmit a second packet 808 while the first packet 804 is being transmitted. STA1 also acts as an AP (AP2) in, and manages, a second wireless network that includes a second client station (STA2). In response to determining that a duplex transmission is permitted, STA1/AP2 determines to transmit the second packet 808 to STA2.

In an embodiment, STA1/AP2 does not have buffered data that is to be transmitted to AP1; however, STA1/AP2 has buffered data that is to be transmitted to STA2. In an embodiment, the buffered data that is to be transmitted to STA2 is stored in the memory device that is included in, or coupled to, the MAC processor 126 (FIG. 1). Thus, in an embodiment, STA1/AP2 determines to transmit the second packet 808 to STA2 further in response to determining i) STA1/AP2 does not have buffered data that is to be transmitted to AP1, and ii) STA1/AP2 has buffered data that is to be transmitted to STA2

After a suitable time duration (e.g., SIFS or another suitable time duration) after an end of the first packet 804, the STA1/AP2 transmits an acknowledgment packet 812 to AP1.

The indication that a duplex transmission is permitted in the packet 804 (or in a previous packet not shown in FIG. 8) is in a PHY header of the packet, or in a frame included in the packet (e.g., in a MAC header included in the frame, or in a MAC data portion in the frame), in various embodiments. In some embodiments, the indication that a duplex transmission is permitted is included in a control frame such as the control frame 400 of FIG. 4, or in a field of a MAC header such as the control field 500 of FIG. 5.

Figure 9A:
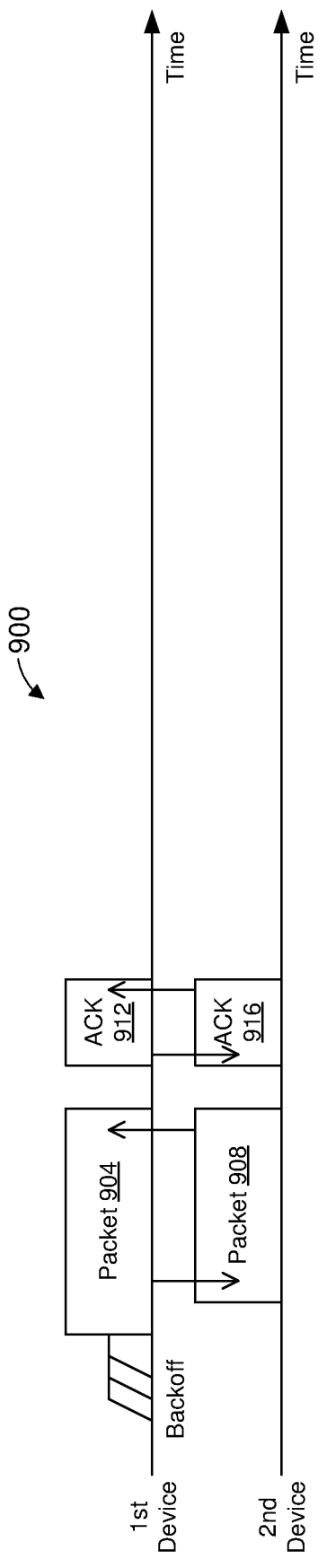
FIG. 9A is a timing diagram of another example duplex communication exchange, according to another embodiment.

FIG. 9A is a timing diagram of another example duplex communication exchange 900, according to another embodiment. A first communication device transmits a first packet 904 to a second communication device. The first packet 904 includes an indication that a duplex transmission is permitted while the first communication device transmits the first packet 904. In another embodiment, a previous packet (not shown) transmitted by the first communication device includes the indication that a duplex transmission is permitted while the first communication device transmits the first packet 904.

The second communication device determines, based on the indication that a duplex transmission is permitted, that the second communication device can transmit a second packet 908 while the first packet 904 is being transmitted. The second communication device generates the second packet 908 to include an indication that the first communication device should immediately acknowledge receipt of the second packet 908 by transmitting an acknowledgment packet 912 a suitable time duration (e.g., SIFS or another suitable time duration) after an end of reception of the second packet 908. In an embodiment, the indication that the first communication device should immediately acknowledge receipt of the second packet 908 is included in a MAC header in the second packet 908.

After a suitable time duration (e.g., SIFS or another suitable time duration) after an end of the first packet 904, the second communication device transmits an acknowledgment packet 916 to the first communication device.

The first communication device receives the second packet 908 and, in response to the indication that the first communication device should immediately acknowledge receipt of the second packet 908, generates the acknowledgment packet 912, and transmits the acknowledgment packet 912 the suitable time duration (e.g., SIFS or another suitable time duration) after the end of reception of the second packet 908 and while the first communication device is receiving the acknowledgment packet 916.

In an embodiment, the second packet 908 includes a field (e.g., in a MAC header of a frame included in the second packet 908) for indicating a duration of the second packet 908 ("duration field"). In an embodiment, the second communication device sets the duration field to a value that indicates a time period equal to a sum of i) the suitable time duration (e.g., SIFS or another suitable time duration), and ii) a duration of the acknowledgment packet 916. In another embodiment, the second communication device sets the duration field in the second packet 908 based on a value included in a duration field in the first packet 904.

In an embodiment, the first communication device generates the acknowledgment packet 912 to have a duration at least approximately equal to a duration of the acknowledgment packet 916 (e.g., within 1% of the duration of the acknowledgment packet 916, within 2% of the acknowledgment packet 916, within 5% of the acknowledgment packet 916, within 10% of the acknowledgment packet 916, etc.). In an embodiment, the first communication device selects a modulation and coding scheme (MCS) for the acknowledgment packet 912 such that the acknowledgment packet 912 has the duration at least approximately equal to the duration of the acknowledgment packet 916. In an embodiment, the first communication device determines the duration of the acknowledgment packet 916 using information in the duration field in the second packet 908.

In some embodiments, duplex transmissions to a TXOP initiator are not permitted to request immediate acknowledgments. Thus, in some embodiments, the second communication device generates the second packet 908 so that the second packet 908 does not include the indication that the first communication device should immediately acknowledge receipt of the second packet 908. In such embodiments, the first communication device does not transmit the acknowledgment packet 912 as shown in FIG. 9A. In an embodiment in which the second packet 908 does not include the indication that the first communication device should immediately acknowledge receipt of the second packet 908, the second communication device sets the duration field in the second packet 908 to zero. In another embodiment in which the second packet 908 does not include the indication that the first communication device should immediately acknowledge receipt of the second packet 908, the second communication device sets the duration field in the second packet 908 based on a value included in a duration field in the first packet 904.

Figure 9B:
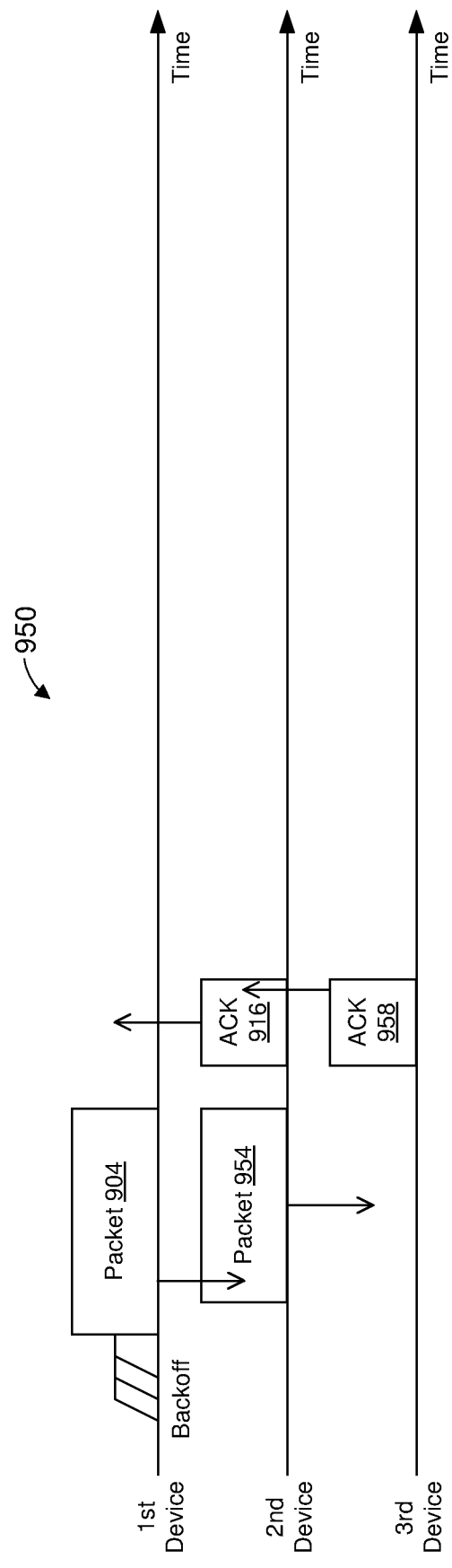
FIG. 9B is a timing diagram of another example duplex communication exchange, according to another embodiment.

FIG. 9B is a timing diagram of another example duplex communication exchange 950, according to another embodiment. The duplex communication exchange 950 is similar to the duplex communication exchange 900, and like-numbered elements are not discussed in detail for brevity.

The second communication device determines, based on the indication that a duplex transmission is permitted, that the second communication device can transmit a second packet 954 to a third communication device while the first packet 904 is being transmitted. The second communication device generates the second packet 954 to include an indication that the third communication device should immediately acknowledge receipt of the second packet 954 by transmitting an acknowledgment packet 958 a suitable time duration (e.g., SIFS or another suitable time duration) after an end of reception of the second packet 954. In an embodiment, the indication that the third communication device should immediately acknowledge receipt of the second packet 954 is included in a MAC header in the second packet 954.

The third communication device receives the second packet 954 and, in response to the indication that the third communication device should immediately acknowledge receipt of the second packet 954, generates the acknowledgment packet 958, and transmits the acknowledgment packet 958 the suitable time duration (e.g., SIFS or another suitable time duration) after the end of reception of the second packet 954 and while the second communication device is transmitting the acknowledgment packet 916.

In an embodiment, the second packet 954 includes a field (e.g., in a MAC header of a frame included in the second packet 954) for indicating a duration of the second packet 954 ("duration field"). In an embodiment, the second communication device sets the duration field to a value that indicates a time period equal to a sum of i) the suitable time duration (e.g., SIFS or another suitable time duration), and ii) a duration of the acknowledgment packet 916. In another embodiment, the second communication device sets the duration field in the second packet 954 based on a value included in a duration field in the first packet 904.

In an embodiment, the third communication device generates the acknowledgment packet 958 to have a duration at least approximately equal to a duration of the acknowledgment packet 916 (e.g., within 1% of the duration of the acknowledgment packet 916, within 2% of the acknowledgment packet 916, within 5% of the acknowledgment packet 916, within 10% of the acknowledgment packet 912, etc.). In an embodiment, the third communication device selects a modulation and coding scheme (MCS) for the acknowledgment packet 958 such that the acknowledgment packet 958 has the duration at least approximately equal to the duration of the acknowledgment packet 916. In an embodiment, the first communication device determines the duration of the acknowledgment packet 916 using information in the duration field in the second packet 954.

In some embodiments, duplex transmissions to third communication devices are not permitted to request immediate acknowledgments. Thus, in some embodiments, the second communication device generates the second packet 954 so that the second packet 954 does not include the indication that the third communication device should immediately acknowledge receipt of the second packet 954. In such embodiments, the third communication device does not transmit the acknowledgment packet 958 as shown in FIG. 9B. In an embodiment in which the second packet 954 does not include the indication that the first communication device should immediately acknowledge receipt of the second packet 954, the second communication device sets the duration field in the second packet 954 to zero. In another embodiment in which the second packet 954 does not include the indication that the first communication device should immediately acknowledge receipt of the second packet 954, the second communication device sets the duration field in the second packet 954 based on a value included in a duration field in the first packet 904.

Referring now to FIGS. 3A-C, 6A-D, 7, 8, and 9A-B, the TXOP responder performs a clear channel assessment (CCA) operation prior to receiving the packet from the TXOP initiator to determine whether a wireless medium is busy during a time period immediately prior to the beginning of the reception of the packet from the TXOP initiator, according to some embodiments. The TXOP responder performs the duplex transmission further in response to determining, based on the CCA operation, that the wireless medium is not busy during the time period immediately prior to the beginning of the reception of the packet from the TXOP initiator, according to some embodiments. In other embodiments, however, the TXOP responder does not perform such a CCA operation and the duplex transmission is not based on such a CCA operation.

Figure 10:
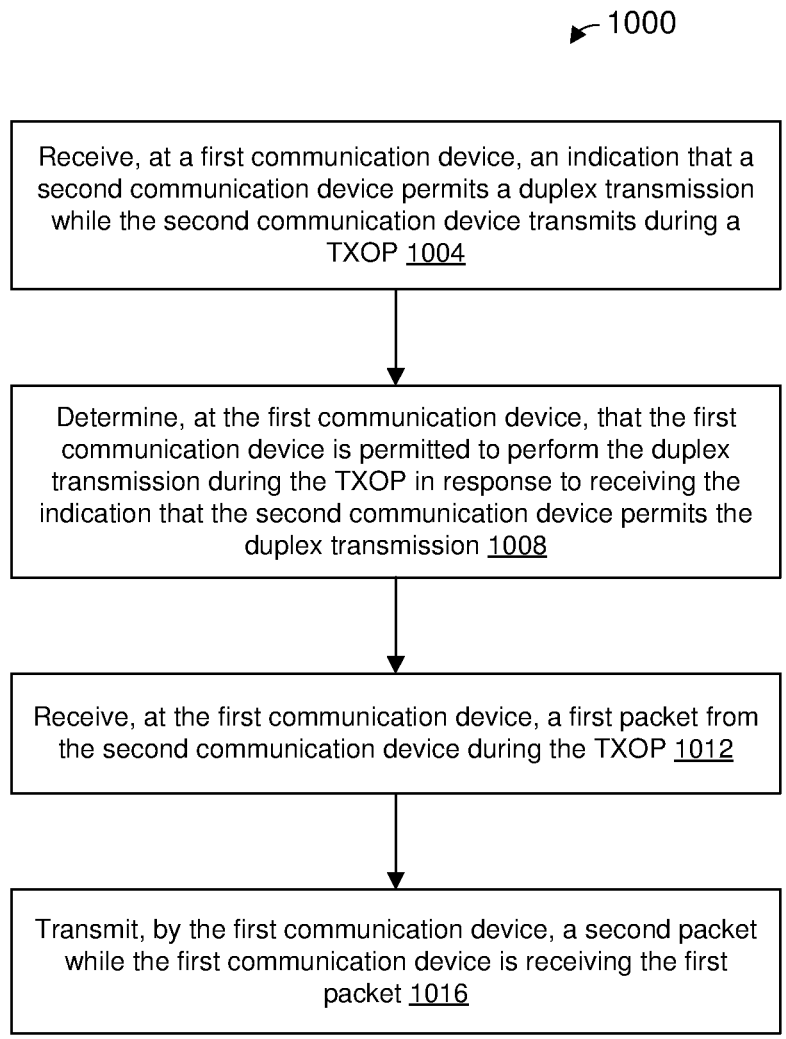
FIG. 10 is a flow diagram of an example method for participating in a duplex transmission, according to an embodiment.

FIG. 10 is a flow diagram of an example method 1000 for participating in a duplex transmission, according to an embodiment. In some embodiments, the network interface device 122 of FIG. 1 is configured to implement the method 1000. The method 1000 is described in the context of the network interface device 122 merely for explanatory purposes and, in other embodiments, the method 1000 is implemented by another suitable device. For example, in some embodiments, the network interface device 162 of FIG. 1 is configured to implement the method 1000. The method 1000 is described in the context of FIGS. 4 and 5 merely for explanatory purposes. In other embodiments, the method 1000 is performed in connection with other MAC data units, MAC data unit formats, MAC headers, MAC fields, etc.

At block 1004, a first communication device (e.g., an AP, a client station, a network interface device such as the network interface device 122 or the network interface device 162, etc.) receives an indication that a second communication device permits a duplex transmission while the second communication device transmits during a TXOP established by the second communication device. In an embodiment, the indication is received from the second communication device via a wireless transmission. In an embodiment, the indication is included in an MDPU. In another embodiment, the indication is included in a PHY header.

At block 1008, the first communication device determines (e.g., the AP determines, the client station determines, the network interface device 122 determines, the network interface device 162 determines, the MAC processor 126 determines, the MAC processor 166 determines, etc.) that the first communication device is permitted to perform the duplex transmission during the TXOP in response to receiving the indication that the second communication device permits the duplex transmission.

At block 1012, the first communication device (e.g., the AP, the client station, the network interface device 122, the network interface device 162, etc.) receives a first packet from the second communication device during the TXOP, wherein the first packet spans a wireless communication channel. In an embodiment, the indication that the second communication device permits the duplex transmission is included in the first packet. In another embodiment, the indication that the second communication device permits the duplex transmission is included in a third packet that is received from the second communication device prior to receiving the first packet.

In an embodiment, the indication is included in an MDPU in the first packet. In an embodiment, the MPDU is a first occurring MPDU in an A-MPDU that includes multiple MPDUs; and the first packet includes the A-MPDU. In an embodiment, the MPDU in the first packet is a control frame such as the control frame 400 of FIG. 4, or another suitable control frame. In an embodiment, the indication is included in a MAC header in the MDPU in the first packet. In an embodiment, the indication is included in a control field in the MAC header such as the control field 500 of FIG. 5 or another suitable control field. In another embodiment, the indication is included in a PHY header of the first packet. In an embodiment, the indication is included in a signal field in the PHY header of the first packet.

In another embodiment, the indication is included in an MDPU in the third packet that is received prior to receiving the first packet. In an embodiment, the MPDU is a first occurring MPDU in an A-MPDU that includes multiple MPDUs; and the third packet includes the A-MPDU. In an embodiment, the MPDU in the third packet is a control frame such as the control frame 400 of FIG. 4, or another suitable control frame. In an embodiment, the indication is included in a MAC header in the MDPU in the third packet. In an embodiment, the indication is included in a control field in the MAC header such as the control field 500 of FIG. 5 or another suitable control field. In another embodiment, the indication is included in a PHY header of the third packet. In an embodiment, the indication is included in a signal field in the PHY header of the third packet.

In an embodiment, the first packet includes a MAC header with a receiver address field that includes a network address (e.g., a MAC address) of an intended recipient of the first packet. In an embodiment, the method 1000 further includes the first communication device (e.g., the AP receives, the client station receives, the network interface device 122 receives, the network interface device 162 receives, etc.) determining whether the network address in the address field in the MAC header of the first packet is the same as a network address associated with the first communication device; and block 1008 comprises the first communication device determining (e.g., the MAC processor 126 determines, the MAC processor 166 determines, etc.) that the first communication device is permitted to perform the duplex transmission during the TXOP further in response to determining that the network address in the address field in the MAC header of the first packet is the same as the network address associated with the first communication device.

At block 1016, the first communication device (e.g., the AP, the client station, the network interface device 122, the network interface device 162, etc.) transmits a second packet while the first communication device is receiving the first packet, and wherein the second packet is transmitted in the wireless communication channel. In an embodiment, the second packet is addressed to/transmitted to the second communication device. In an embodiment in which the second packet is addressed to/transmitted to the second communication device, the method 1000 further comprises the first communication device determining (e.g., the AP determines, the client station determines, the network interface device 122 determines, the network interface device 162 determines, the MAC processor 126 determines, the MAC processor 166 determines, etc.) whether the first communication device has data buffered for the second communication device; and block 1008 comprises the first communication device determining (e.g., the MAC processor 126 determines, the MAC processor 166 determines, etc.) that the first communication device is permitted to perform the duplex transmission during the TXOP further in response to determining that the first communication device has data buffered for the second communication device.

In another embodiment, the second packet is addressed to/transmitted to a third communication device. In an embodiment in which the second packet is addressed to/transmitted to the third communication device, the method 1000 further comprises: the first communication device determining (e.g., the AP determines, the client station determines, the network interface device 122 determines, the network interface device 162 determines, the MAC processor 126 determines, the MAC processor 166 determines, etc.) whether the first communication device has data buffered for the second communication device; the first communication device determining (e.g., the AP determines, the client station determines, the network interface device 122 determines, the network interface device 162 determines, the MAC processor 126 determines, the MAC processor 166 determines, etc.) whether the first communication device has data buffered for the third communication device; and block 1008 comprises the first communication device determining (e.g., the AP determines, the client station determines, the network interface device 122 determines, the network interface device 162 determines, the MAC processor 126 determines, the MAC processor 166 determines, etc.) that the first communication device is permitted to perform the duplex transmission during the TXOP further in response to: i) determining that the first communication device does not have data buffered for the second communication device, and ii) determining that the first communication device has data buffered for the third communication device.

In some embodiments, the method 1000 further includes the first communication device (e.g., the AP, the client station, the network interface device 122, the network interface device 162, etc.) generating the second packet. In an embodiment, the second packet is generated such that the second packet does not include an indication that the second packet is to be immediately acknowledged; and the second packet, when transmitted at block 1016, does not include the indication that the second packet is to be immediately acknowledged. In an embodiment, the second packet is generated such that the second packet includes an indication that the second packet is to be immediately acknowledged; and the second packet, when transmitted at block 1016, includes the indication that the second packet is to be immediately acknowledged.

Figure 11:
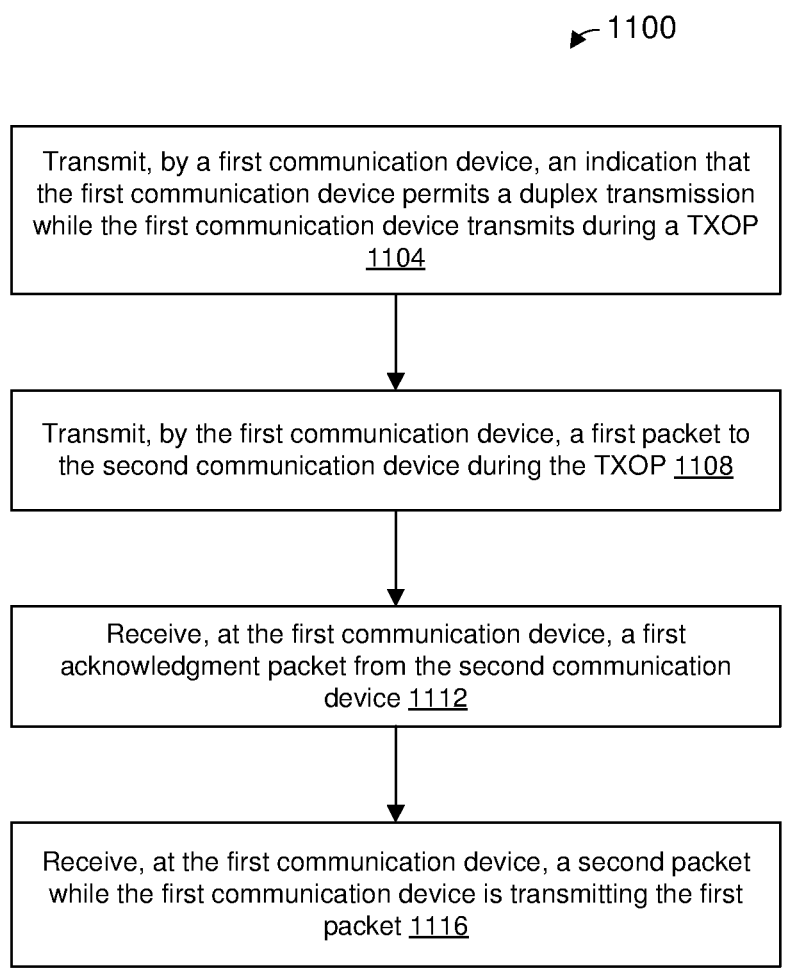
FIG. 11 is a flow diagram of another example method for participating in a duplex transmission, according to another embodiment.

FIG. 11 is a flow diagram of another example method 1100 for participating in a duplex transmission, according to an embodiment. In some embodiments, the network interface device 162 of FIG. 1 is configured to implement the method 1100. The method 1100 is described in the context of the network interface device 162 merely for explanatory purposes and, in other embodiments, the method 1100 is implemented by another suitable device. For example, in some embodiments, the network interface device 122 of FIG. 1 is configured to implement the method 1100. The method 1100 is described in the context of FIGS. 4 and 5 merely for explanatory purposes. In other embodiments, the method 1100 is performed in connection with other MAC data units, MAC data unit formats, MAC headers, MAC fields, etc.

At block 1104, a first communication device (e.g., an AP, a client station, a network interface device such as the network interface device 122, the network interface device 162, etc.) transmits, to a second communication device, an indication that the first communication device permits a duplex transmission while the first communication device transmits during a TXOP established by the first communication device. In an embodiment, the indication is transmitted to the second communication device via a wireless transmission. In an embodiment, the indication is included in an MDPU. In another embodiment, the indication is included in a PHY header.

In an embodiment, the first communication device is permitted to transmit the indication to the second communication device at block 1104 only when i) the first communication device is configured to perform duplex transmissions and ii) the first communication device determines that the second communication device is also configured to perform duplex transmissions.

At block 1108, the first communication device (e.g., the AP, the client station, the network interface device 122, the network interface device 162, etc.) transmits a first packet to the second communication device during the TXOP, wherein the first packet spans a wireless communication channel. In an embodiment, the indication that the first communication device permits the duplex transmission is included in the first packet, and block 1108 includes block 1104. In another embodiment, the indication that the first communication device permits the duplex transmission is included in a third packet that is transmitted by the first communication device prior to transmitting the first packet.

In an embodiment, the indication is included in an MDPU in the first packet. In an embodiment, the MPDU is a first occurring MPDU in an A-MPDU that includes multiple MPDUs; and the first packet includes the A-MPDU. In an embodiment, the MPDU in the first packet is a control frame such as the control frame 400 of FIG. 4, or another suitable control frame. In an embodiment, the indication is included in a MAC header in the MDPU in the first packet. In an embodiment, the indication is included in a control field in the MAC header such as the control field 500 of FIG. 5 or another suitable control field. In another embodiment, the indication is included in a PHY header of the first packet. In an embodiment, the indication is included in a signal field in the PHY header of the first packet.

In another embodiment, the indication is included in an MDPU in the third packet that is transmitted prior to transmitting the first packet. In an embodiment, the MPDU is a first occurring MPDU in an A-MPDU that includes multiple MPDUs; and the third packet includes the A-MPDU. In an embodiment, the MPDU in the third packet is a control frame such as the control frame 400 of FIG. 4, or another suitable control frame. In an embodiment, the indication is included in a MAC header in the MDPU in the third packet. In an embodiment, the indication is included in a control field in the MAC header such as the control field 500 of FIG. 5 or another suitable control field. In another embodiment, the indication is included in a PHY header of the third packet. In an embodiment, the indication is included in a signal field in the PHY header of the third packet.

At block 1112, the first communication device receives (e.g., the AP receives, the client station receives, the network interface device 122 receives, the network interface device 162 receives, etc.) a first acknowledgment packet from the second communication device, where the first acknowledgment packet acknowledges that the second communication device received the first packet. In an embodiment, the first acknowledgment packet is received within a defined time duration (e.g., SIFS or another suitable time duration) after an end of transmission of the first packet. In another embodiment, the first acknowledgment packet is not received within the defined time duration. For example, the first acknowledgment packet is received after the first communication device transmits a third packet after transmitting the first packet.

At block 1116, the first communication device receives (e.g., the AP receives, the client station receives, the network interface device 122 receives, the network interface device 162 receives, etc.) a second packet while the first communication device is transmitting the first packet, and wherein the second packet is transmitted in the wireless communication channel. In an embodiment, the second packet is addressed to/transmitted to the first communication device.

In an embodiment, the second packet includes an indication that the second packet is to be immediately acknowledged. In response to receiving the second packet that includes the indication that the second packet is to be immediately acknowledged, the first communication device generates and transmits (e.g., the AP generates and transmits, the client station generates and transmits, the network interface device 122 generates and transmits, the network interface device 162 generates and transmits, etc.) a second acknowledgment packet that acknowledges receipt of the second packet within the defined time duration (e.g., SIFS) of an end of reception of the second packet. In an embodiment, the second acknowledgment packet is transmitted within the communication channel. In embodiments in which the first communication device receives the first acknowledgment packet within the defined time duration (e.g., SIFS) after the end of the first packet, the first communication device transmits the second acknowledgment packet while the first communication device receives the first acknowledgment packet and such that the first acknowledgment packet and the second acknowledgment packet overlap in frequency.

In an embodiment, the first packet includes information (e.g., in a MAC header included in the first packet, in a duration field in the MAC header, etc.) that indicates a duration of the first acknowledgment packet; and the first communication device determines (e.g., the AP determines, the network interface device 122 determines, the MAC processor 126 determines, the client station determines, the network interface device 162 determines, the MAC processor 166 determines, etc.) a duration of the first acknowledgment packet using the information included in the first packet prior to receiving the first acknowledgment packet. In an embodiment, the first communication device generates (e.g., the AP generates, the client station generates, the network interface device 122 generates, the network interface device 162 generates, etc.) the second acknowledgment packet to have a duration that is equal to, approximately equal to, substantially equal to, etc., the duration of the first acknowledgment packet.

In another embodiment, the second packet does not include an indication that the second packet is to be immediately acknowledged; and, in response to the second packet not including the indication that the second packet is to be immediately acknowledged, the first communication device does not transmit the second acknowledgment packet within the defined time duration (e.g., SIFS) of the end of reception of the second packet.

In another embodiment, the second packet is addressed to/transmitted to a third communication device. In an embodiment in which the second packet is addressed to/transmitted to the third communication device, block 1116 is not performed by the first communication device, and the first communication device does not generate/transmit the second acknowledgment packet to acknowledge receipt of the second packet.

Embodiment 1

A method implemented by a first communication device that is capable of duplex transmissions, wherein duplex transmissions involve simultaneously transmitting and receiving via a same wireless frequency band, the method comprising: receiving, at the first communication device, an indication that a second communication device permits a duplex transmission while the second communication device transmits during a transmit opportunity period (TXOP) established by the second communication device, wherein the indication is received from the second communication device via a wireless transmission, and wherein the indication is included in a media access control layer (MAC) protocol data unit (MPDU); in response to receiving the indication that the second communication device permits the duplex transmission, determining, at the first communication device, that the first communication device is permitted to perform the duplex transmission during the TXOP; receiving, at the first communication device, a first packet from the second communication device during the TXOP, wherein the first packet spans a wireless communication channel; and transmitting, by the first communication device, a second packet while the first communication device is receiving the first packet, and wherein the second packet is transmitted in the wireless communication channel.

Embodiment 2

The method of embodiment 1, wherein the indication that the second communication device permits the duplex transmission is received by the first communication device in a third packet prior to receiving the first packet, wherein the third packet includes the MPDU having the indication that the second communication device permits the duplex transmission.

Embodiment 3

The method of embodiment 2, wherein the third packet is received by the first communication device prior to the TXOP.

Embodiment 4

The method of embodiment 1, wherein the indication that the second communication device permits the duplex transmission is included in the first packet, and wherein the first packet includes the MPDU having the indication that the second communication device permits the duplex transmission.

Embodiment 5

The method of embodiment 4, wherein: the MPDU is a first occurring MPDU in an aggregate MPDU (A-MPDU) that includes multiple MPDUs; and the first packet includes the A-MPDU.

Embodiment 6

The method of any of embodiments 1-5, wherein the indication that the second communication device permits the duplex transmission is included in a MAC header of the MPDU.

Embodiment 7

The method of any of embodiments 1-5, wherein: the MPDU includes a MAC header and a MAC data portion; and the indication that the second communication device permits the duplex transmission is included in the MAC data portion.

Embodiment 8

The method of any of embodiments 1-7, further comprising: determining, at the first communication device, whether the first communication device has data buffered for the second communication device; wherein determining that the first communication device is permitted to perform the duplex transmission during the TXOP is further in response to determining that the first communication device has data buffered for the second communication device.

Embodiment 9

The method of any of embodiments 1-7, further comprising: determining, at the first communication device, whether the first communication device has data buffered for the second communication device; determining, at the first communication device, whether the first communication device has data buffered for a third communication device; and determining, at the first communication device, that the second packet is to be transmitted to the third communication device; wherein determining that the first communication device is permitted to perform the duplex transmission during the TXOP is further in response to i) determining that the first communication device does not have data buffered for the second communication device, and i) determining that the first communication device has data buffered for the third communication device.

Embodiment 10

The method of any of embodiments 1-9, further comprising: generating, at the first communication device, the second packet such that the second packet does not include an indication that the second packet is to be immediately acknowledged; wherein the second packet, when transmitted, does not include the indication that the second packet is to be immediately acknowledged.

Embodiment 11

The method of any of embodiments 1-10, further comprising: performing, at the first communication device, a clear channel assessment (CCA) operation prior to receiving the first packet from the TXOP initiator to determine whether a wireless medium is busy during a time period immediately prior to a beginning of reception of the first packet; wherein determining that the first communication device is permitted to perform the duplex transmission during the TXOP is further in response to determining that the wireless medium is not busy during the time period immediately prior to the beginning of reception of the first packet.

Embodiment 12

An apparatus, comprising: a network interface device associated with a first communication device, wherein the network interface device is capable of duplex transmissions, wherein duplex transmissions involve simultaneously transmitting and receiving via a same wireless frequency band. The network interface device includes one or more integrated circuit (IC) devices configured to: receive an indication that a second communication device permits a duplex transmission while the second communication device transmits during a transmit opportunity period (TXOP) established by the second communication device, wherein the indication is received from the second communication device via a wireless transmission, and wherein the indication is included in a media access control layer (MAC) protocol data unit (MPDU); in response to receiving the indication that the second communication device permits the duplex transmission, determine that the network interface device is permitted to perform the duplex transmission during the TXOP; receive a first packet from the second communication device during the TXOP, wherein the first packet spans a wireless communication channel; and transmit a second packet while the first communication device is receiving the first packet, and wherein the second packet is transmitted in the wireless communication channel.

Embodiment 13

The apparatus of embodiment 12, wherein the indication that the second communication device permits the duplex transmission is received by the network interface device in a third packet prior to receiving the first packet, wherein the third packet includes the MPDU having the indication that the second communication device permits the duplex transmission.

Embodiment 14

The apparatus of embodiment 13, wherein the third packet is received by the network interface device prior to the TXOP.

Embodiment 15

The apparatus of embodiment 12, wherein the indication that the second communication device permits the duplex transmission is included in the first packet, and wherein the first packet includes the MPDU having the indication that the second communication device permits the duplex transmission.

Embodiment 16

The apparatus of embodiment 15, wherein: the MPDU is a first occurring MPDU in an aggregate MPDU (A-MPDU) that includes multiple MPDUs; and the first packet includes the A-MPDU.

Embodiment 17

The apparatus of any of embodiments 12-16, wherein the indication that the second communication device permits the duplex transmission is included in a MAC header of the MPDU.

Embodiment 18

The apparatus of any of embodiments 12-16, wherein: the MPDU includes a MAC header and a MAC data portion; and the indication that the second communication device permits the duplex transmission is included in the MAC data portion.

Embodiment 19

The apparatus of any of embodiments 12-18, wherein the one or more ICs are further configured to: determine whether the network interface device has data buffered for the second communication device; and determine that the first communication device is permitted to perform the duplex transmission during the TXOP further in response to determining that the first communication device has data buffered for the second communication device.

Embodiment 20

The apparatus of claim any of embodiments 12-18, wherein the one or more ICs are further configured to: determine whether the network interface device has data buffered for the second communication device; determine whether the network interface device has data buffered for a third communication device; determine that the second packet is to be transmitted to the third communication device; determine that the first communication device is permitted to perform the duplex transmission during the TXOP further in response to i) determining that the first communication device does not have data buffered for the second communication device, and i) determining that the first communication device has data buffered for the third communication device.

Embodiment 21

The apparatus of any of embodiments 12-20, wherein the one or more ICs are further configured to: generate the second packet such that the second packet does not include an indication that the second packet is to be immediately acknowledged; wherein the second packet, when transmitted, does not include the indication that the second packet is to be immediately acknowledged.

Embodiment 22

The apparatus of any of embodiments 12-21, wherein the one or more ICs are further configured to: perform a clear channel assessment (CCA) operation prior to receiving the first packet from the TXOP initiator to determine whether a wireless medium is busy during a time period immediately prior to a beginning of reception of the first packet; and determine that the first communication device is permitted to perform the duplex transmission during the TXOP further in response to determining that the wireless medium is not busy during the time period immediately prior to the beginning of reception of the first packet.

Embodiment 23

The apparatus of any of embodiments 12-22, wherein: the network interface device comprises i) a media access control (MAC) processor implemented on the one or more IC devices, and ii) a physical layer (PHY) processor implemented on the one or more IC devices, and coupled to the MAC processor; and the MAC processor is configured to: in response to the network interface device receiving the indication that the second communication device permits the duplex transmission, determine that the network interface device is permitted to perform the duplex transmission during the TXOP.

Embodiment 24

A method implemented by a first communication device that is capable of duplex transmissions, wherein duplex transmissions involve simultaneously transmitting and receiving via a same wireless frequency band, the method comprising: transmitting, by the first communication device, an indication that the first communication device permits a duplex transmission while the first communication device transmits during a transmit opportunity period (TXOP) established by the first communication device, wherein the indication is transmitted to a second communication device via a wireless transmission, and wherein the indication is included in a media access control layer (MAC) protocol data unit (MPDU); transmitting, by the first communication device, a first packet to the second communication device during the TXOP, wherein the first packet spans a wireless communication channel; and receiving, at the first communication device, an acknowledgment packet from the second communication device, wherein the acknowledgment packet acknowledges receipt of the first packet.

Embodiment 25

The method of embodiment 24, wherein the first communication device transmits the indication that the first communication device permits the duplex transmission in a second packet prior to transmitting the first packet, wherein the second packet includes the MPDU having the indication that the first communication device permits the duplex transmission.

Embodiment 26

The method of embodiment 25, wherein the second packet is transmitted by the first communication device prior to the TXOP.

Embodiment 27

The method of embodiment 24, wherein the indication that the first communication device permits the duplex transmission is included in the first packet, and wherein the first packet includes the MPDU having the indication that the second communication device permits the duplex transmission.

Embodiment 28

The method of embodiment 27, wherein: the MPDU is a first occurring MPDU in an aggregate MPDU (A-MPDU) that includes multiple MPDUs; and the first packet includes the A-MPDU.

Embodiment 29

The method of any of embodiments 24-28, wherein the indication the first communication device permits the duplex transmission is included in a MAC header of the MPDU.

Embodiment 30

The method of any of embodiments 24-28, wherein: the MPDU includes a MAC header and a MAC data portion; and the indication that the first communication device permits the duplex transmission is included in the MAC data portion.

Embodiment 31

The method of any of embodiments 24-30, wherein: the acknowledgment packet received from the second communication device is a first acknowledgment packet; the method further comprises: transmitting, by the first communication device, a second acknowledgment packet to the second communication device while the first communication device is receiving the first acknowledgment packet; and the second acknowledgment packet is transmitted in the wireless communication channel.

Embodiment 32

The method of embodiment 31, wherein: the second packet includes an indication that the first communication device is to immediately acknowledge the second packet; and the first communication device transmits the second acknowledgment packet while the first communication device is receiving the first acknowledgment packet in response to the indication in the second packet that the first communication device is to immediately acknowledge the second packet.

Embodiment 33

An apparatus, comprising: a network interface device associated with a first communication device, wherein the network interface device is capable of duplex transmissions, wherein duplex transmissions involve simultaneously transmitting and receiving via a same wireless frequency band. The network interface device includes one or more integrated circuit (IC) devices configured to: transmit an indication that the first communication device permits a duplex transmission while the first communication device transmits during a transmit opportunity period (TXOP) established by the first communication device, wherein the indication is transmitted to a second communication device via a wireless transmission, and wherein the indication is included in a media access control layer (MAC) protocol data unit (MPDU); transmit a first packet to the second communication device during the TXOP, wherein the first packet spans a wireless communication channel; and receive an acknowledgment packet from the second communication device, wherein the acknowledgment packet acknowledges receipt of the first packet.

Embodiment 34

The apparatus of embodiment 33, wherein the one or more IC devices are configured to transmit the indication that the first communication device permits the duplex transmission in a second packet prior to transmitting the first packet, wherein the second packet includes the MPDU having the indication that the first communication device permits the duplex transmission.

Embodiment 35

The apparatus of embodiment 34, wherein the one or more IC devices are configured to transmit the second packet prior to the TXOP.

Embodiment 36

The apparatus of embodiment 33, wherein the indication that the first communication device permits the duplex transmission is included in the first packet, and wherein the first packet includes the MPDU having the indication that the second communication device permits the duplex transmission.

Embodiment 37

The apparatus of embodiment 36, wherein: the MPDU is a first occurring MPDU in an aggregate MPDU (A-MPDU) that includes multiple MPDUs; and the first packet includes the A-MPDU.

Embodiment 38

The apparatus of any of embodiments 33-37, wherein the indication the first communication device permits the duplex transmission is included in a MAC header of the MPDU.

Embodiment 39

The apparatus of any of embodiments 33-37, wherein: the MPDU includes a MAC header and a MAC data portion; and the indication that the first communication device permits the duplex transmission is included in the MAC data portion.

Embodiment 40

The apparatus of any of embodiments 33-39, wherein: the acknowledgment packet received from the second communication device is a first acknowledgment packet; and the one or more IC devices are further configured to: transmit a second acknowledgment packet to the second communication device while the network interface device is receiving the first acknowledgment packet; and the second acknowledgment packet is transmitted in the wireless communication channel.

Embodiment 41

The apparatus of claim 40, wherein: the second packet includes an indication that the first communication device is to immediately acknowledge the second packet; the one or more IC devices are further configured to: transmit the second acknowledgment packet while the first communication device is receiving the first acknowledgment packet in response to the indication in the second packet that the first communication device is to immediately acknowledge the second packet.

Embodiment 42

The apparatus of any of embodiments 33-41, wherein: the network interface device comprises i) a media access control (MAC) processor implemented on the one or more IC devices, and ii) a physical layer (PHY) processor implemented on the one or more IC devices, and coupled to the MAC processor; and the MAC processor is configured to: generate the MPDU that includes the indication that the first communication device permits the duplex transmission.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method implemented by a first communication device that is capable of duplex transmissions, wherein duplex transmissions involve simultaneously transmitting and receiving via a same wireless frequency band, the method comprising:
   receiving, at the first communication device, duplex transmission permission information corresponding to a transmit opportunity period (TXOP) established by a second communication device, the duplex transmission permission information indicating that the second communication device permits a duplex transmission during the TXOP and while the second communication device transmits, wherein the duplex transmission permission information is received from the second communication device via a wireless transmission, and wherein the duplex transmission permission information is included in a media access control layer (MAC) protocol data unit (MPDU);
   in response to receiving the duplex transmission permission information, determining, at the first communication device, that the first communication device is permitted to perform the duplex transmission during the TXOP;
   receiving, at the first communication device, a first packet from the second communication device during the TXOP, wherein the first packet spans a wireless communication channel; and
   transmitting, by the first communication device, a second packet while the first communication device is receiving the first packet, and wherein the second packet is transmitted in the wireless communication channel.

2. The method of claim 1, wherein the duplex transmission permission information is received by the first communication device in a third packet prior to receiving the first packet, wherein the third packet includes the MPDU having the duplex transmission permission information.

3. The method of claim 2, wherein the third packet is received by the first communication device prior to the TXOP.

4. The method of claim 1, wherein the duplex transmission permission information is included in the first packet, and wherein the first packet includes the MPDU having the duplex transmission permission information.

5. The method of claim 4, wherein:
   the MPDU is a first occurring MPDU in an aggregate MPDU (A-MPDU) that includes multiple MPDUs; and
   the first packet includes the A-MPDU.

6. The method of claim 1, wherein the duplex transmission permission information is included in a MAC header of the MPDU.

7. The method of claim 1, wherein:
   the MPDU includes a MAC header and a MAC data portion; and
   the duplex transmission permission information is included in the MAC data portion.

8. The method of claim 1, further comprising:
   determining, at the first communication device, whether the first communication device has data buffered for the second communication device;
   wherein determining that the first communication device is permitted to perform the duplex transmission during the TXOP is further in response to determining that the first communication device has data buffered for the second communication device.

9. The method of claim 1, further comprising:
determining, at the first communication device, whether the first communication device has data buffered for the second communication device;
determining, at the first communication device, whether the first communication device has data buffered for a third communication device; and
determining, at the first communication device, that the second packet is to be transmitted to the third communication device;
wherein determining that the first communication device is permitted to perform the duplex transmission during the TXOP is further in response to i) determining that the first communication device does not have data buffered for the second communication device, and i) determining that the first communication device has data buffered for the third communication device.

10. The method of claim 1, further comprising:
generating, at the first communication device, the second packet such that the second packet does not include an indication that the second packet is to be immediately acknowledged;
wherein the second packet, when transmitted, does not include the indication that the second packet is to be immediately acknowledged.

11. The method of claim 1, further comprising:
performing, at the first communication device, a clear channel assessment (CCA) operation prior to receiving the first packet from the TXOP initiator to determine whether a wireless medium is busy during a time period immediately prior to a beginning of reception of the first packet;
wherein determining that the first communication device is permitted to perform the duplex transmission during the TXOP is further in response to determining that the wireless medium is not busy during the time period immediately prior to the beginning of reception of the first packet.

12. An apparatus, comprising:
a network interface device associated with a first communication device, wherein the network interface device is capable of duplex transmissions, wherein duplex transmissions involve simultaneously transmitting and receiving via a same wireless frequency band, and wherein the network interface device includes one or more integrated circuit (IC) devices configured to:
receive duplex transmission permission information corresponding to a transmit opportunity period (TXOP) established by a second communication device, the duplex transmission permission information indicating that the second communication device permits a duplex transmission during the TXOP and while the second communication device transmits, wherein the duplex transmission permission information is received from the second communication device via a wireless transmission, and wherein the duplex transmission permission information is included in a media access control layer (MAC) protocol data unit (MPDU),
in response to receiving the duplex transmission permission information, determine that the network interface device is permitted to perform the duplex transmission during the TXOP,
receive a first packet from the second communication device during the TXOP, wherein the first packet spans a wireless communication channel, and
transmit a second packet while the first communication device is receiving the first packet, and wherein the second packet is transmitted in the wireless communication channel.

13. A method implemented by a first communication device that is capable of duplex transmissions, wherein duplex transmissions involve simultaneously transmitting and receiving via a same wireless frequency band, the method comprising:
transmitting, by the first communication device, duplex transmission permission information corresponding to a transmit opportunity period (TXOP) established by the first communication device, the duplex transmission permission information indicating that the first communication device permits a duplex transmission during the TXOP and while the first communication device transmits, wherein the duplex transmission permission information is transmitted to a second communication device via a wireless transmission, and wherein the duplex transmission permission information is included in a media access control layer (MAC) protocol data unit (MPDU);
transmitting, by the first communication device, a first packet to the second communication device during the TXOP, wherein the first packet spans a wireless communication channel; and
receiving, at the first communication device, an acknowledgment packet from the second communication device, wherein the acknowledgment packet acknowledges receipt of the first packet.

14. The method of claim 13, wherein the first communication device transmits the duplex transmission permission information in a second packet prior to transmitting the first packet, wherein the second packet includes the MPDU having the duplex transmission permission information.

15. The method of claim 14, wherein the second packet is transmitted by the first communication device prior to the TXOP.

16. The method of claim 13, wherein the duplex transmission permission information is included in the first packet, and wherein the first packet includes the MPDU having the duplex transmission permission information.

17. The method of claim 16, wherein:
the MPDU is a first occurring MPDU in an aggregate MPDU (A-MPDU) that includes multiple MPDUs; and
the first packet includes the A-MPDU.

18. The method of claim 13, wherein the duplex transmission permission information is included in a MAC header of the MPDU.

19. The method of claim 13, wherein:
the MPDU includes a MAC header and a MAC data portion; and
the duplex transmission permission information is included in the MAC data portion.

20. The method of claim 13, wherein:
the acknowledgment packet received from the second communication device is a first acknowledgment packet;
the method further comprises: transmitting, by the first communication device, a second acknowledgment packet to the second communication device while the first communication device is receiving the first acknowledgment packet; and
the second acknowledgment packet is transmitted in the wireless communication channel.

21. The method of claim 20, wherein:

the second packet includes an indication that the first communication device is to immediately acknowledge the second packet; and the first communication device transmits the second acknowledgment packet while the first communication device is receiving the first acknowledgment packet in response to the indication in the second packet that the first communication device is to immediately acknowledge the second packet.

22. An apparatus, comprising:

a network interface device associated with a first communication device, wherein the network interface device is capable of duplex transmissions, wherein duplex transmissions involve simultaneously transmitting and receiving via a same wireless frequency band, and wherein the network interface device includes one or more integrated circuit (IC) devices configured to:

transmit duplex transmission permission information corresponding to a transmit opportunity period (TXOP) established by the first communication device, the duplex transmission permission information indicating that the first communication device permits a duplex transmission during the TXOP and while the first communication device transmits, wherein the duplex transmission permission information is transmitted to a second communication device via a wireless transmission, and wherein the duplex transmission permission information is included in a media access control layer (MAC) protocol data unit (MPDU), transmit a first packet to the second communication device during the TXOP, wherein the first packet spans a wireless communication channel, receive an acknowledgment packet from the second communication device, wherein the acknowledgment packet acknowledges receipt of the first packet.

* * * * *